United States Patent
Mine et al.

(10) Patent No.: US 10,852,209 B2
(45) Date of Patent: Dec. 1, 2020

(54) WATER LEAK SENSING SYSTEM AND METHOD

(71) Applicant: HITACHI, LTD., Tokyo (JP)

(72) Inventors: Toshiyuki Mine, Tokyo (JP); Yuudai Kamada, Tokyo (JP); Tetsuya Ishimaru, Tokyo (JP); Kazuo Ono, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/556,746

(22) Filed: Aug. 30, 2019

(65) Prior Publication Data

US 2020/0103306 A1    Apr. 2, 2020

(30) Foreign Application Priority Data

Sep. 28, 2018  (JP) ................................. 2018-183281

(51) Int. Cl.
| | | |
|---|---|---|
| *G08B 21/00* | (2006.01) | |
| *G01M 3/24* | (2006.01) | |
| *G01M 3/18* | (2006.01) | |
| *G01M 3/00* | (2006.01) | |

(52) U.S. Cl.
CPC ............ *G01M 3/243* (2013.01); *G01M 3/007* (2013.01); *G01M 3/18* (2013.01)

(58) Field of Classification Search
CPC ......... G01M 3/243; G01M 3/007; G01M 3/18
USPC ....................................................... 340/605
See application file for complete search history.

(56) References Cited

U.S. PATENT DOCUMENTS

| | | | | |
|---|---|---|---|---|
| 5,708,195 A * | 1/1998 | Kurisu | ...................... | F17D 5/02 340/605 |
| 9,470,601 B1 * | 10/2016 | Chaudhary | ......... | G01M 3/2807 |
| 2004/0225458 A1 * | 11/2004 | Sherikar | ................... | F17D 5/02 702/51 |
| 2013/0036796 A1 * | 2/2013 | Fleury, Jr. | ............... | E03B 7/071 73/40.5 R |
| 2014/0121999 A1 * | 5/2014 | Bracken | ................ | G01M 3/243 702/51 |
| 2014/0150554 A1 * | 6/2014 | Rada | ........................ | H04B 1/10 73/592 |
| 2015/0002300 A1 * | 1/2015 | Cho | ........................ | G01M 3/18 340/605 |

(Continued)

FOREIGN PATENT DOCUMENTS

| | | |
|---|---|---|
| JP | 09-23483 A | 1/1997 |
| JP | 2005-331374 A | 12/2005 |
| JP | 2017-167063 A | 9/2017 |

*Primary Examiner* — Kerri L McNally
*Assistant Examiner* — Thang D Tran
(74) *Attorney, Agent, or Firm* — Mattingly & Malur, PC

(57) ABSTRACT

A water leak sensing system includes: a plurality of sensor terminals including a sensor installed in a pipeline of a water supply network; and a computer that senses a water leak from the pipeline based on detection signal data of the plurality of sensors of the plurality of sensor terminals, and outputs a result. The pipeline is either a first pipeline not covered by a pipe covering member (PE sleeve) or a second pipeline covered by the pipe covering member. The sensor can detect a signal at a first distance from a water leak point when the water leak occurs in the first pipeline, and detect a signal at a second distance, longer than the first distance, from the water leak point when the water leak occurs in the second pipeline.

12 Claims, 21 Drawing Sheets

(56) References Cited

U.S. PATENT DOCUMENTS

| | | | |
|---|---|---|---|
| 2015/0046099 A1* | 2/2015 | Kamoi | G01N 19/08 |
| | | | 702/34 |
| 2015/0153243 A1* | 6/2015 | Al-Sayed Wahba | F17D 5/005 |
| | | | 73/40 |
| 2015/0247777 A1* | 9/2015 | Kondou | G01P 13/0073 |
| | | | 73/49.1 |
| 2015/0308917 A1* | 10/2015 | Soda | G01M 3/002 |
| | | | 702/36 |
| 2015/0350752 A1* | 12/2015 | Solomon | G01M 3/243 |
| | | | 340/870.01 |
| 2015/0355045 A1* | 12/2015 | Solomon | F17D 5/02 |
| | | | 702/36 |
| 2016/0097746 A1* | 4/2016 | Traub | G01N 29/44 |
| | | | 702/39 |
| 2016/0238547 A1* | 8/2016 | Park | C08K 3/22 |
| 2016/0252422 A1* | 9/2016 | Howitt | E03B 7/071 |
| | | | 73/40.5 A |
| 2016/0290886 A1* | 10/2016 | Takata | G01M 3/243 |
| 2016/0351040 A1* | 12/2016 | Zokaei | G08B 21/20 |
| 2017/0030798 A1* | 2/2017 | DeVerse | G06F 19/00 |
| 2017/0045416 A1* | 2/2017 | Hansen | G01M 3/18 |
| 2017/0102286 A1* | 4/2017 | Inoue | G01N 29/14 |
| 2017/0219157 A1* | 8/2017 | Ethirajan | H04W 4/70 |
| 2017/0219454 A1* | 8/2017 | Chaudhary | G01M 3/2815 |
| 2017/0234709 A1* | 8/2017 | Mackie | G01F 1/075 |
| | | | 73/861.08 |
| 2017/0238072 A1* | 8/2017 | Mackie | G01F 1/60 |
| | | | 340/870.03 |
| 2017/0322105 A1* | 11/2017 | Guixeras Nogue | |
| | | | G01M 3/2807 |
| 2018/0348080 A1* | 12/2018 | Inoue | G01M 3/243 |
| 2019/0128767 A1* | 5/2019 | Burtea | G01B 17/02 |
| 2019/0353550 A1* | 11/2019 | Park | B32B 5/12 |

\* cited by examiner

WITHOUT PE SLEEVE
WATER LEAK: ABSENT

WITHOUT PE SLEEVE
WATER LEAK: RELEASE TO AIR
VIBRATION INTENSITY: LOW

WITH PE SLEEVE
WATER LEAK: RELEASE TO WATER
VIBRATION INTENSITY: HIGH

FIG. 16

| PIPE TYPE/<br>DIAMETER | WATER LEAK<br>AMOUNT | WATER<br>PRESSURE |
|---|---|---|
| DK75* | 7L/min | 0.4MPa |

| | VIBRATION INTENSITY<br>NEAR WATER LEAK POINT | WATER LEAK<br>SENSING-POSSIBLE<br>DISTANCE |
|---|---|---|
| WITHOUT PE SLEEVE | 200 ($\mu$G/$\sqrt{}$Hz) | ABOUT 70 m |
| WITH PE SLEEVE | 8 ($\mu$G/$\sqrt{}$Hz) | ABOUT 140 m |

⊗ : WATER CONTROL VALVE WHERE SENSOR SA IS INSTALLED

○ : WATER CONTROL VALVE WHERE SENSOR SB IS NOT INSTALLED
⊙ : WATER CONTROL VALVE WHERE SENSOR SB IS INSTALLED

FIG. 23A
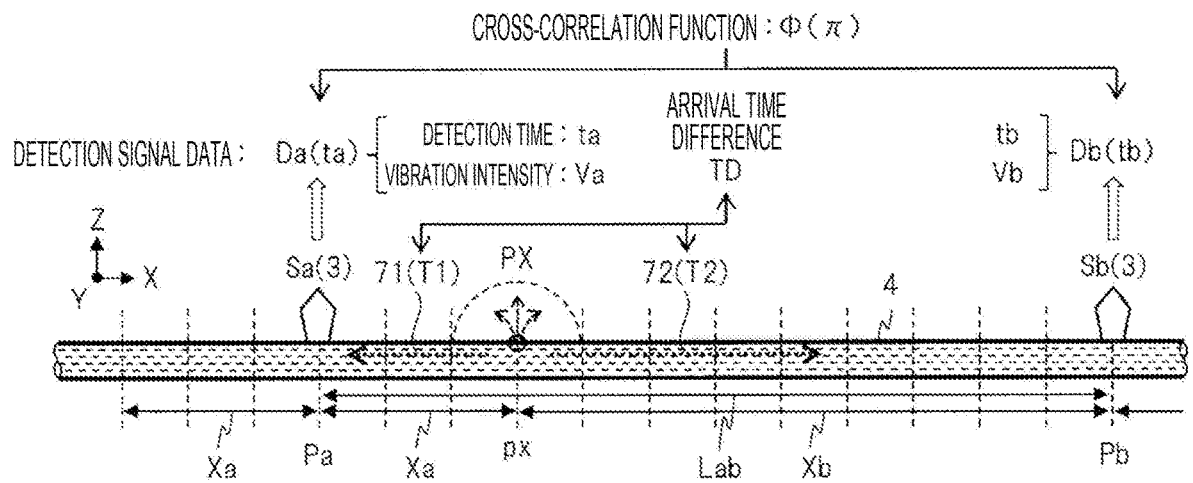
FIG. 23B
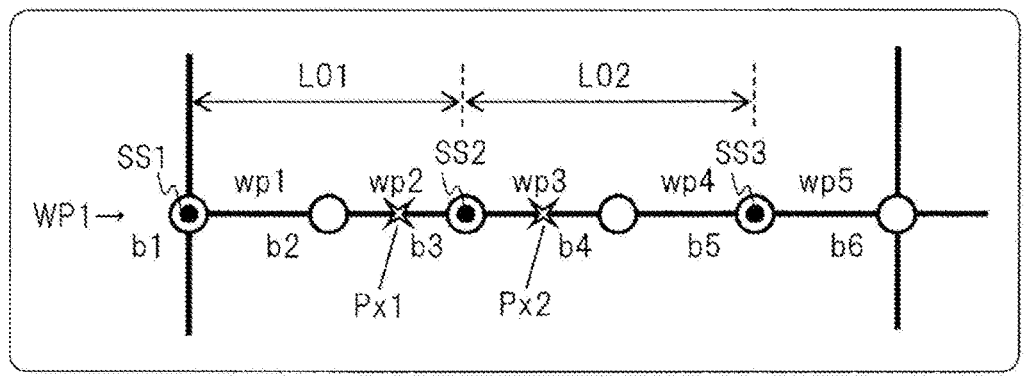
FIG. 23C
| PAIR ID | FIRST SENSOR ID | SECOND SENSOR ID | PIPELINE ID | DISTANCE | ... |
|---|---|---|---|---|---|
| 1 | SS1 | SS2 | wp1, wp2 | L01 | ... |
| 2 | SS2 | SS3 | wp3, wp4 | L02 | ... |
| 3 | ... | ... | ... | ... | ... |

WATER LEAK SENSING SYSTEM AND METHOD

CROSS-REFERENCE TO RELATED APPLICATION

The present application claims priority from Japanese application JP 2018-183281, filed on Sep. 28, 2018, the contents of which is hereby incorporated by reference into this application.

BACKGROUND OF THE INVENTION

1. Field of the Invention

The present invention relates to a technique such as a system configured to sense or estimate fluid leak of a buried pipe in the ground in a pipeline network such as waterworks.

2. Description of the Related Art

For example, a system (sometimes referred to as a water leak sensing system) configured to sense and estimate a water leak in water pipes of waterworks has been developed. In a water leak sensing system according to a prior art example, a sensor is installed in a buried pipe, and the sensor detects the vibration of the buried pipe. This system determines presence or absence and a position of a water leak of the buried pipe based on analysis processing of a detection signal acquired from the sensor.

Prior art examples relating to the water leak sensing system include JP 2017-167063 A, JP 9-23483 A, and JP 2005-331374 A.

JP 2017-167063 A describes a leak position detection method or the like in which a leak position of a fluid in an underground buried pipe is specified using a closed circuit radar device and a "liquid-blocking covering member" that covers a pipe to prevent contact with soil and the like are provided. JP 9-23483 A describes a pipeline break detection system in which a large number of sensors including a wireless communication function and a water leak estimation function are installed on a pipeline of a pipeline network, and adjacent sensors cooperate to perform water leak sensing in a dispersed manner. JP 2005-331374 A describes a water leak monitoring device or the like in which a vibration sensor converts a water leak sound vibration transmitted through a water pipe into an electric signal and it is determined any water leak sensing level among a plurality of water leak sensing levels to which the water leak sound vibration corresponds.

SUMMARY OF THE INVENTION

Conventionally, there are a case where a pipe covering member such as a polyethylene sleeve (PE sleeve) is installed with respect to a pipeline of a water pipe in a water supply network and a case where the pipe covering member is not installed to the pipeline. The presence and absence of the pipe covering member are mixed depending on a region, an age, and a detailed pipeline. The pipeline is installed in combination with the PE sleeve, for example, when a local government newly installs a water pipe or when an old pipe is replaced with a new pipe. The pipe covering member is a member configured to prevent an outer peripheral surface of the water pipe from being corroded due to contact with the soil containing moisture and the like. The pipe covering member has a sleeve shape arranged to cover the outer periphery of the water pipe, and is made of resin, such as polyethylene (PE), having a corrosion preventing function and a waterproof function.

The water leak sensing system of the prior art example does not consider the presence or absence of a pipe covering member such as a PE sleeve in a pipeline to be sensed, and does not consider characteristics of a water leak and the influence on water leak sensing depending on the presence or absence of the pipe covering member. In the water leak sensing system of the prior art example, a large number of vibration sensors, for example, are installed on the pipeline as sensors for leak sensing. This sensor does not take into consideration the influence of the presence or absence of the pipe covering member in an environment near a water leak point. The sensor is installed, for example, as a sensor having detection characteristics on the premise that there is no pipe covering member. The sensor has a predetermined distance that enables sensing of a water leak, in other words, a predetermined distance that enables sensing of a corresponding water leak signal (sometimes referred to as a water leak sensing-possible distance), with respect to the water leak point. This distance is set to be the same regardless of the presence or absence of the pipe covering member.

In the water leak sensing system of the prior art example, a plurality of sensors are arranged in the pipeline network at an interval and a density in accordance with the water leak sensing-possible distance. It is necessary to arrange the large number of sensors with a higher density as the water leak sensing-possible distance becomes shorter. Therefore, the number of sensors installed in the pipeline network is large in the water leak sensing system of the prior art example so that there is a case where the cost increases, including equipment cost, management cost, and the like.

In addition, a computer analyzes a detection signal of the sensor and determines presence or absence of a water leak and the like in the water leak sensing system of the prior art example, but there is no consideration regarding the influence of the presence or absence of the pipe covering member of the pipeline. Thus, there is a case where the water leak sensing accuracy is lowered in the water leak sensing system of the prior art example depending on the environment such as the presence or absence of the pipe covering member near the water leak point of the pipeline.

As described above, the water leak sensing system of the prior art example has room for improvement from the viewpoint of the sensor arrangement cost, the water leak sensing accuracy, and the like.

An object of the invention is to provide a technique capable of realizing reduction of sensor arrangement cost, improvement of water leak sensing accuracy, and the like in relation to a technique of a water leak sensing system. Other objects, configurations, and effects which have not been described above become apparent from modes for carrying out the invention to be described hereinafter.

Representative embodiments of the invention have the following configuration. A water leak sensing system of one embodiment includes: a plurality of sensor terminals that include sensors each installed in a pipeline in a pipeline network and detecting a vibration of the pipeline as a signal, the pipeline buried in ground and allowing a fluid of water or another substance to flow; and a computer that communicates with the plurality of sensor terminals, senses a leak of the fluid from the pipeline based on detection signal data of a plurality of the sensors of the plurality of sensor terminals, and outputs a result. The pipeline of the pipeline network is either a first pipeline not covered by a pipe covering member or a second pipeline covered by the pipe covering member. The sensor is capable of detecting the signal at a first distance from a leak point when the leak occurs in the first pipeline, and capable of detecting the signal at a second distance, longer than the first distance, from the leak point when the leak occurs in the second pipeline. The plurality of sensors in the pipeline network are arranged at an interval with the first distance as a reference in a first area including the first pipeline in the pipeline network, and are arranged at an interval with the second distance as a reference in a second area of the pipeline network including the second pipeline based on pipeline information including information on presence or absence of the pipe covering member in the pipeline network.

According to the representative embodiment of the invention, it is possible to realize the reduction of sensor arrangement cost, the improvement of water leak sensing accuracy, and the like with respect to the technique of the water leak sensing system.

BRIEF DESCRIPTION OF THE DRAWINGS

FIG. 16 is a table illustrating pipeline conditions and characteristics of the sensor depending on presence or absence of the PE sleeve in an implementation example in the water leak sensing system of the first embodiment;

FIG. 23A is a view illustrating a cross-correlation scheme relating to a water leak position determination in the water leak sensing systems of the first embodiment and the second embodiment;

FIG. 23B is a view illustrating an example of a pipeline and the like relating to a water leak position determination in the water leak sensing systems of the first embodiment and the second embodiment; and FIG. 23C is a view illustrating a configuration example of a pair list relating to the cross-correlation scheme in the water leak sensing systems of the first embodiment and the second embodiment.

DESCRIPTION OF THE PREFERRED EMBODIMENTS

Figure 1:
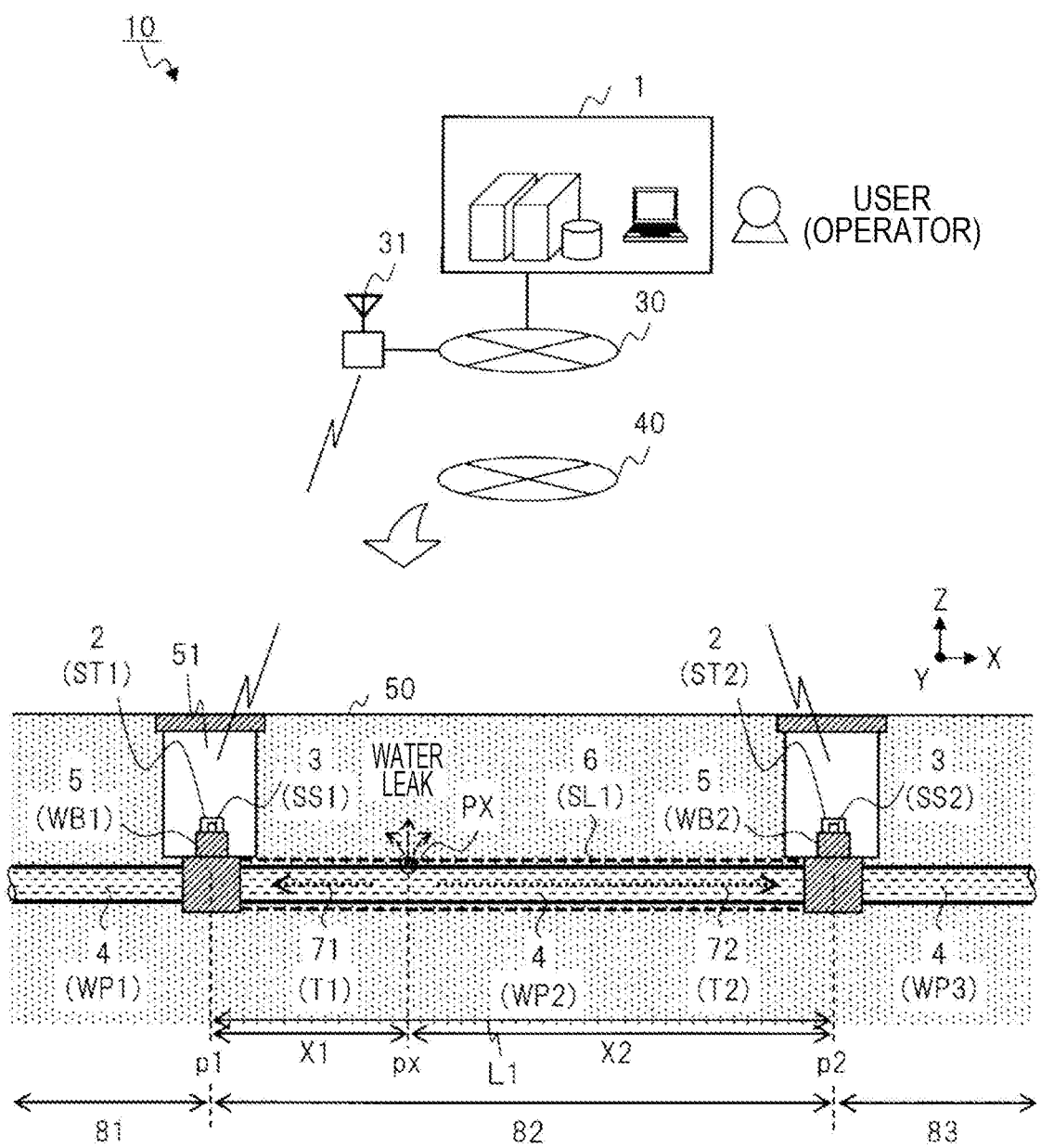
FIG. 1 is a diagram illustrating an entire configuration of a water leak sensing system according to a first embodiment of the invention.

Hereinafter, embodiments of the invention will be described in detail with reference to the drawings. The following description and drawings are examples for the purpose of describing the invention, and are sometimes omitted or simplified as appropriate for the sake of clarity. The invention can be implemented in various other forms. Each component may be singular or plural unless particularly limited. In the drawings, in principle, the same parts will be denoted by the same reference signs, and repeated descriptions will be omitted. When there are a plurality of components having the same or similar functions, reference signs obtained by adding subscripts to the same reference sign will be used in some cases. Positions, sizes, shapes, ranges, and the like of the respective elements illustrated in the drawings do not indicate actual positions and the like in some cases in order to facilitate understanding of the invention. Therefore, the invention is not necessarily limited to the positions, sizes, shapes, ranges, and the like disclosed in the drawings. In the drawings, cross-sectional hatching is sometimes omitted for the sake of clarity.

In the following description, program processing or information processing will be described in some cases. A program is a processor is executed by a processor (a processing device or a computing device, for example, a CPU, an MPU, a GPU, and the like) of a computer while appropriately utilizing a storage resource, an input/output interface, a peripheral device (for example, a communication port), or the like. The program processing may be implemented using general-purpose software program processing or may be implemented using a dedicated hardware circuit or the like such as an FPGA and an ASIC. The program may be stored as data in a storage medium (computer-readable storage medium) or the like. The processor reads the data of the program from the storage medium or the like onto a processing memory (such as a RAM), and executes processing according to the program. As a result, a predetermined function and the like is realized. A subject of the program processing is basically the processor, but may be a controller having the processor, a device such as a computer, a node, or a system including these parts. A source of the program data may be stored in a server (for example, a program distribution server) or a database on a communication network (for example, the Internet), or may be in the form of being used by being installed or downloaded to a computer. One program may be further constituted by a plurality of programs, or a plurality of programs may be implemented as a single program.

In the following description, various types of information and data are sometimes described with an expression of a data structure such as a table and a list, but various types of information and data may be realized by a form other than such a data structure. In order to indicate that various types of information and data do not depend on the data structure, there is a case where various types of information and data are described as "information" or "data". When a description is given regarding identification information, expressions such as "identification information", an "identifier", an "ID", a "number", and a "name", are used in some cases, but these are similar expressions and can be replaced.

First Embodiment

A water leak sensing system according to a first embodiment of the invention will be described with reference to FIGS. 1 to 19. The water leak sensing system according to the first embodiment is an example of a monitoring system of buried pipe infrastructure, and a case where the system is applied as a water leak sensing system of a water supply network of waterworks. The water leak sensing system according to the first embodiment is a system that senses and estimates a water leak in a water pipe by program processing of a computer using a plurality of vibration sensors installed in a pipeline of the water supply network. A water leak sensing method according to the first embodiment is a method including a step to be executed in the water leak sensing system according to the first embodiment. A local government or a business operator uses the water leak sensing system according to the first embodiment. Incidentally, this water leak sensing system may be connected in parallel with, for example, an existing water supply management system or the like, or a function of this water leak sensing system may be integrated and implemented in the existing water supply management system or the like.

A predetermined user (also referred to as operator) involved in water supply management or water leak sensing performs an input operation of an instruction and setting with respect to the water leak sensing system of the first embodiment through a screen or the like serving as a graphical user interface (GUI) provided by this system. The user receives an output of result information of the water leak sensing, information relating to the water supply management, and the like through this screen or the like. The user can confirm a situation such as presence or absence and a position of a water leak in the water supply network on this screen, and can promptly cooperate with water leak confirmation work and repair work performed by a worker.

The water leak sensing system according to the first embodiment can propose a suitable sensor arrangement when the local government installs a sensor for water leak sensing in a regional water supply network or when an existing sensor arrangement is reviewed. The water leak sensing system according to the first embodiment inputs, acquires, or refers to pipeline information including PE sleeve presence/absence information from, for example, an existing water supply management system, and stores the pipeline information in a memory. Then, the water leak sensing system performs peculiar processing using the pipeline information. The water leak sensing system determines different sensor arrangements depending on an area and presence or absence of a PE sleeve in the pipeline.

[Water Leak Sensing System (1)]

FIG. 1 illustrates a configuration of a water leak sensing system 10 according to the first embodiment and configuration examples of an underground water pipe 4, a sensor 3, and the like. The water leak sensing system 10 according to the first embodiment includes a computer 1 and a plurality of sensor terminals 2. The sensor 3, which is a water leak sensing sensor, is incorporated in the sensor terminal 2. The water leak sensing system 10 uses a vibration sensor as the sensor 3. The water leak sensing system 10 is a system that senses a fluid leak in the pipeline, and particularly a system that senses a leak of water, that is, a water leak in the water pipe 4 relating to a target water supply network 40. The operator who is the predetermined user operates the computer 1 of the water leak sensing system 10. The computer 1 is a part that performs main control of the water leak sensing system 10, and is connected to a communication network 30. The computer 1 may be a computer system or the like constituted by elements such as one or more PCs, servers, storages, and communication devices, or may be configured using a cloud computing system or the like.

On the lower side of FIG. 1, an overview is illustrated in a vertical cross section (XZ plane) regarding a part of the water pipe 4 and the like constituting the water supply network 40. An X direction is one direction in the horizontal direction, a Y direction is the other direction in the horizontal direction, and a Z direction is the vertical direction. A state where the water pipe 4 and the like are buried in the ground below a ground surface 50 corresponding to a certain land is illustrated on the lower side of FIG. 1. In the soil in the ground, the water pipe 4 is buried at a predetermined position in the Z direction from the ground surface 50. In this example, the water pipe 4 is a single pipeline extending in the X direction, and has a water pipe WP1, a water pipe WP2, and a water pipe WP3 as each part of the water pipe 4. A water control valve 5 is provided in the middle of the water pipe 4. In this example, the water control valve 5 includes a water control valve WB1 between the water pipe WP1 and the water pipe WP2 and a water control valve WB2 between the water pipe WP2 and the water pipe WP3.

Holes 51, configured to allow the worker to access the water control valve 5 and the like for maintenance and the like, are provided on the ground surface 50. The hole 51 is also called a utility area or a box. The water control valve 5 is installed in a space, obtained by opening a lid, in the hole 51. At least an operable valve portion of the water control valve 5 is exposed inside the hole 51 so that the worker can operate the valve. The water control valve 5 can be operated to open and close, for example. In an open state of the water control valve 5, water flows inside the adjacent water pipes 4. In a closed state, the water is stopped so as not to flow between the adjacent water pipes 4.

The sensor terminal 2 is installed to the water control valve 5 at a position selected in advance among the plurality of water control valves 5 of the water supply network 40. In this example, a sensor terminal ST1 is installed to the water control valve WB1, and a sensor terminal ST2 is installed to the water control valve WB2. As the sensor 3, a sensor SS1 and a sensor SS2 are incorporated in the sensor terminal ST1 and the sensor terminal ST2, respectively. The sensor terminal 2 is attachable to and detachable from the water control valve 5. The sensor 3 of the sensor terminal 2 is fixed, for example, in contact with a surface of the water control valve 5 in order to detect a vibration. For example, the sensor 3 of the sensor terminal 2 is fixed in contact with one place of a part of the water control valve 5, exposed to the upper side, in the hole 51.

The sensor terminal 2 is a wireless communication terminal device including the sensor 3. Each of the sensor terminals 2 is connected to be capable of communicating with the computer 1 through the communication network 30. The communication network 30 includes a known wireless communication network and a wired communication network. The communication network 30 includes a base station 31 constituting the wireless communication network. The sensor terminal 2 has a wireless communication function and performs wireless communication with the base station 31.

As a result, the computer 1 and each of the sensor terminals 2 can communicate via the communication network 30. The sensor terminal 2 may have a positioning function using a GPS receiver or the like. In such a case, the computer 1 can also grasp and manage a position of each of the sensor terminals 2 using position information obtained by the GPS or the like.

The sensor 3 is a vibration sensor that detects a vibration or a sound of the water pipe 4 through the water control valve 5. The vibration sensor may be an acceleration sensor, a displacement sensor, a microphone or the like. The sensor 3 is not installed directly in the water pipe 4 in the soil that is hard to access, but installed in the water control valve 5 that is easy to access. Even if the sensor 3 is installed to the water control valve 5, it is possible to detect the water leak vibration of the water pipe 4 with sufficiently high accuracy. In addition, the worker can perform an operation such as installation and an inspection regarding the sensor terminal 2 together at the time of operating the water control valve 5.

The water control valve 5 is a valve configured to control water flow of the water pipe 4, and is sometimes called a gate valve, a control valve, or the like. Examples of the water control valve 5 include a valve configured to stop water inside the water pipe 4. When a water leak of the water pipe 4 occurs, the water control valve 5 relating to a pipeline where such a water leak is present is closed. Since an end portion of the water pipe 4 and the water control valve 5 are physically connected, the water leak vibration is transmitted from the water pipe 4 to the sensor 3 through the water control valve 5.

In addition, there are a case where the water pipe 4 is installed with the PE sleeve 6 serving as a pipe covering member and a case where the water pipe 4 is not installed with the PE sleeve 6 serving as a pipe covering member. This example illustrates a case where the PE sleeve 6 is not installed in the water pipes WP1 and WP3 and the PE sleeve 6 (PE sleeve SL1) is installed in the water pipe WP2. An outer periphery of the water pipe WP2 is covered by the PE sleeve SL1, and the soil is present on the outer periphery of the PE sleeve SL1. Although the presence or absence of installation of the PE sleeve 6 usually becomes collective installation to some extent for each region or area of the water supply network 40, FIG. 1 illustrates a case where the presence and absence of the PE sleeve 6 are mixed for each partial pipeline of the adjacent water pipes 4 for the sake of description. Areas 81 and 83 represent areas where the PE sleeve 6 is not installed, and an area 82 represents an area where the PE sleeve 6 is installed.

In FIG. 1, a water leak point PX, which is one point on the way of the water pipe WP2, is illustrated as an example of the water leak point. A position of the water control valve WB1 is set as a position p1, and a position of the water control valve WB2 is set as a position p2, in the X direction of the water pipe 4. A distance between the position p1 of the water control valve WB1 and the position p2 of the water control valve WB2 is set as a distance L1. A position of the water leak point PX is set as a position px. A distance between the position p1 of the water control valve WB1 and the position px of the water leak point PX is set as a distance X1, and a distance between the position p2 of the water control valve WB2 and the position px of the water leak point PX is set as a distance X2. It is established that X1+X2=L1. Incidentally, information, such as the positions p1 and p2 of the water control valve 5 and the distance L1, is held as the pipeline information and the like in the water leak sensing system or the water supply management system.

When a water leak from the water leak point PX occurs, water leak vibrations 71 and 72 are transmitted to the left and right of the X direction in the drawing, respectively, on the pipeline of the water pipe 4. The sensor SS1 detects the water leak vibration 71. The sensor SS2 detects the water leak vibration 72. There is a case where a plurality of pipelines are connected to the sensors 3 of the respective water control valves 5. For example, the sensor SS1 of the water control valve WB1 detects not only the vibration from the water pipe WP2 on the right side in the X direction illustrated in the drawing but also the vibration from the water pipe WP1 on the left side.

Communication is performed between the computer 1 and the sensor terminal 2 by a predetermined communication scheme. In particular, communication is performed between the base station 31 and the sensor terminal 2 by a predetermined wireless communication scheme. For example, the computer 1 transmits a request to the sensor terminal 2, and the sensor terminal 2 having received the request transmits detection signal data to the computer 1. Incidentally, another communication device may be interposed between the computer 1 and the sensor terminal 2 as a component. For example, relay devices may be arranged in units of groups with a certain number of the sensor terminals 2 among the plurality of sensor terminals 2 as one group. The relay device performs data relay and the like between the computer 1 and the plurality of sensor terminals 2 of the group. Alternatively, some sensor terminals 2 of the plurality of sensor terminals 2 may be provided with a relay function or the like as representatives. Such sensor terminals 2 acquire data from the other sensor terminals 2 in the group and transmit the data to the computer 1.

The computer 1 periodically acquires the detection signal data from the plurality of sensor terminals 2 as monitoring. The computer 1 performs analysis processing using the detection signal data collected from the plurality of sensor terminals 2, and determines the presence or absence, the amount, the position, and the like of the water leak. The computer 1 stores sensing result information in the memory and displays the sensing result information on the screen to deliver the sensing result information to the user. For example, the computer 1 displays information such as a pipeline, a position, and the like where the water leak has occurred on a map of the water supply network on the screen. In addition, the computer 10 displays an arrangement of the plurality of sensors 3 with respect to the plurality of water control valves 5 of the water supply network 40 on the screen in advance, and enables the user to confirm and set the sensor arrangement. In addition, the user may access the computer 1 from a client terminal device such as a PC other than the computer 1 to use the function thereof.

Although the configuration in which the sensor 3 is incorporated in the sensor terminal 2 has been adopted, another configuration can be adopted without being limited thereto. It may be configured such that the sensor 3 and a wireless communication device are configured separately, installed at remote positions, and electrically connected. The wireless communication device may be installed at a position of another object other than the water control valve 5.

[Water Leak Sensing System (2)]

Figure 2:
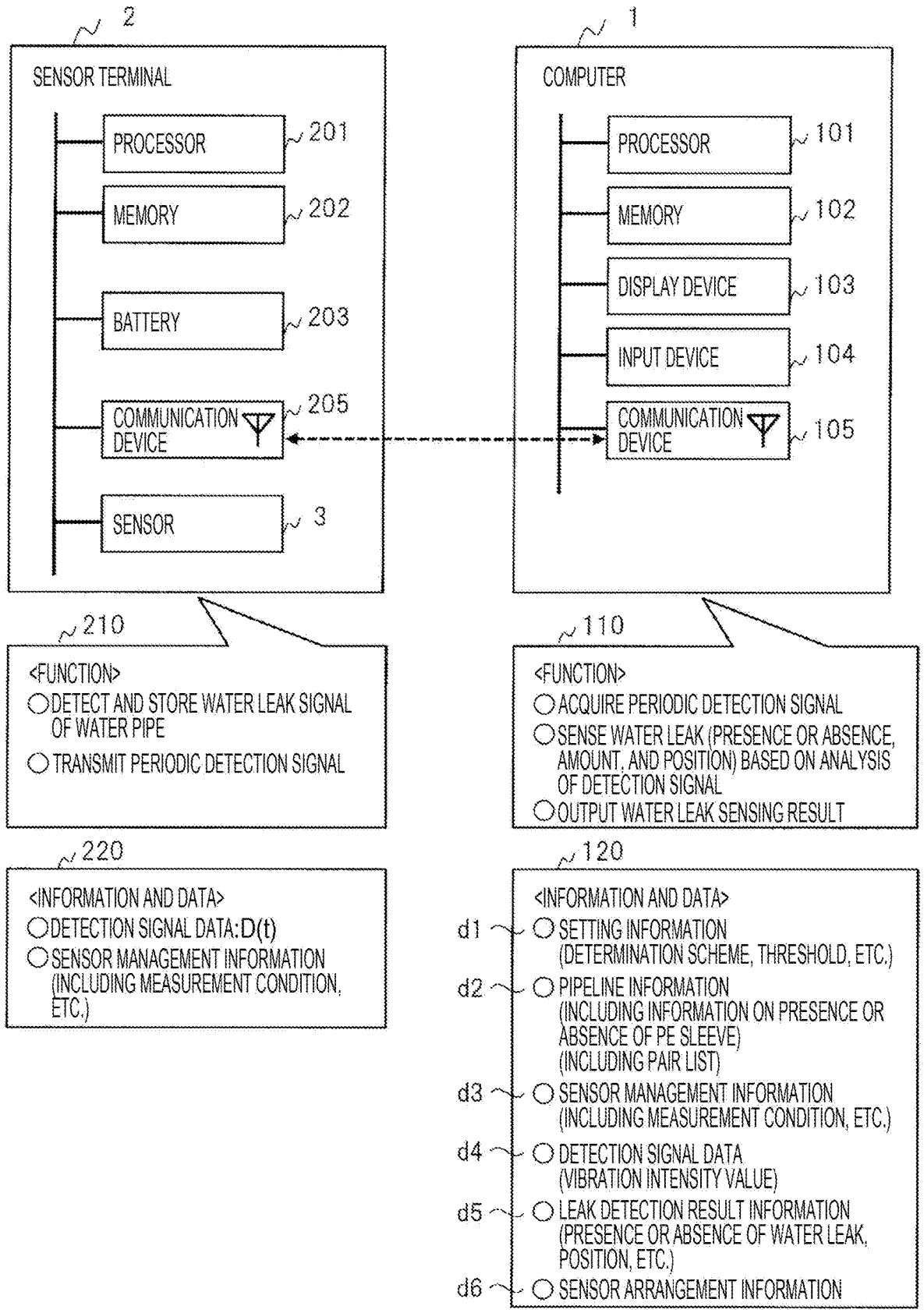
FIG. 2 is a diagram illustrating configurations of a computer and a sensor terminal in the water leak sensing system of the first embodiment.

FIG. 2 illustrates configurations of the computer 1 and the sensor terminal 2. The computer 1 includes a processor 101, a memory 102, a display device 103, an input device 104, a communication device 105, and the like which are connected via a bus. The sensor terminal 2 includes a processor 201, a memory 202, a battery 203, a communication device 205, a sensor 3, and the like which are connected via a bus.

The processor 101 of the computer 1 is constituted by a CPU, a ROM, a RAM, and the like, and implements a water leak sensing function 110 by executing processing according to a program. The water leak sensing function 110 includes each function of acquisition of periodic detection signal data from a plurality of sensor terminals 2, water leak sensing based on analysis of the detection signal data, and water leak sensing result output. The water leak sensing includes a determination on presence or absence of a water leak, a water leak amount, a water leak position, and the like. The processor 101 controls each unit, and stores various types of information and data in the memory 102. The memory 102 includes, as information and data 120, setting information d1, pipeline information d2, sensor management information d3, detection signal data d4, water leak sensing result information d5, sensor arrangement information d6, and the like. The memory 102 additionally stores screen data, map data, and the like. Incidentally, various types of data may be stored in a database server or the like outside the computer 1.

The setting information d1 includes settings relating to a water leak determination scheme and setting values such as a threshold of a condition, and corresponds to system management information. The setting information d1 or the pipeline information d2 may include information on a type, a shape, a size, a material, and the like of the water pipe 4 and setting values such as propagation speed of a vibration sound for determination calculation.

The pipeline information d2 is information representing configurations of a pipeline of the water supply network 40 and the water control valve 5, and includes PE sleeve presence/absence information (pipe covering member presence/absence information). The PE sleeve presence/absence information is information including presence or absence of installation of the PE sleeve (pipe covering member) in a pipeline or an area including the pipeline, and specifically, may include information such as a type, a shape, a size, a material, and installation time of the pipe covering member. Incidentally, the existing pipeline information held by the local government or the like includes at least graphical information on the pipeline of the water supply network 40 and the water control valve 5. Accordingly, the water leak sensing system 10 can construct the pipeline information d2 using such pipeline information, and can use the pipeline information d2 for the sensor arrangement and the water leak determination. A data structure and the like of the pipeline information d2 are not particularly limited.

The sensor management information d3 is management information on the plurality of sensors 3 and includes setting information such as an ID, a position, and a measurement condition for each of the sensors 3. Incidentally, an ID of the sensor terminal 2 and the ID of the sensor 3 may be collectively set as the same ID. The position of the sensor 3 may be collectively set to be the same as a position of the water control valve 5. Examples of the measurement condition include a sampling frequency, a frequency band, and the like.

The detection signal data d4 is detection signal data $D(t)$ of the sensor 3 acquired from the sensor terminal 2, and includes a vibration intensity value. Incidentally, the computer 1 may save the history of the detection signal data d4 or may display a graph on the screen.

The water leak sensing result information d5 is sensing result information such as presence or absence of a water leak, a water leak amount, and a water leak position, and includes information to be displayed on the screen. Incidentally, the computer 1 may save detailed analysis data.

The sensor arrangement information d6 is setting information on the arrangement of the plurality of sensors 3 with respect to the water supply network 40, and is associated with the pipeline information d4 and the sensor management information d3. Since the sensor terminal 2 is installed in the water control valve 5, a sensor arrangement position in the sensor arrangement information d6 can be represented by the ID or the position of the water control valve 5. The sensor arrangement information d6 or the sensor management information d3 may include information such as a water leak sensing-possible distance of the sensor 3, an inter-sensor distance of a pair of the sensors 3, and a spacing distance to be used as a reference at the time of arranging the sensors 3. The pipeline information d2, the sensor management information d3, or the sensor arrangement information d6 includes information (a pair list to be described later) on a pair of the sensors 3 used at the time of determining the water leak position by a cross-correlation scheme.

The display device 103 includes a display screen, and a GUI screen of the water leak sensing system 10 is displayed. The GUI screen includes a setting screen and the like to be described later. The input device 104 is various devices that allows the user to perform input operations. The communication device 105 is a predetermined communication interface device that performs communication processing with the communication network 30, and may be a wireless communication interface device.

The processor 201 of the sensor terminal 2 is constituted by a CPU, a ROM, a RAM, and the like, and implements a function 210 relating to water leak signal detection by executing processing according to a program. This function 210 includes each function of detection and storage of a water leak signal of the water pipe 4 and transmission of periodic detection signal data. The processor 201 controls each unit, and stores various types of information and data 220 in the memory 202. The memory 202 includes detection signal data, sensor management information, and the like as the various types of information and data 220. The detection signal data is data including the detection signal data D(t) measured in a time-series manner. The sensor management information is setting information and management information on the individual sensors 3 corresponding to the sensor management information d3 on the computer 1 side.

The battery 203 supplies power for the operation of the sensor terminal 2. The communication device 205 is a wireless communication interface device including an antenna, and performs wireless communication processing with the base station 31 of the communication network 30.

The sensor 3 performs a measurement operation based on the measurement condition set based on the sensor management information. The sensor 3 detects a vibration or sound on the time series and outputs the detected vibration or sound as the detection signal data D(t). The sensor terminal 2 stores the detection signal data D(t) of the sensor 3 in the memory 202. Examples of the measurement condition include a measurement time of one-time measurement, a time interval and a frequency at the time of measuring a signal by sampling, and the like. When receiving a request for a detection signal from the computer 1, the sensor terminal 2 reads the detection signal data from the memory 202 and transmits the detection signal data to be addressed to the computer 1 in the form of a predetermined packet or the like. When receiving a setting instruction and setting information (corresponding sensor management information and the like) from the computer 1, the sensor terminal 2 stores the setting information in the memory 202.

As described above, the computer 1 of the water leak sensing system 10 of the first embodiment collects the detection signal data of the sensor 3 using wireless communication. The water leak sensing system 10 uses the wireless communication, and thus, can automatically perform the collection of the detection signal data from the plurality of sensor terminals 2. As a result, it is possible to minimize the time and effort for the collection of the sensor detection signal data by the worker.

Incidentally, it is preferable to control the sensor terminal 2 not in a constantly operating state but in a sleep state under a normal condition in order to suppress power consumption of the battery 203 of the sensor terminal 2. For example, the sensor terminal 2 is in the sleep state regarding a power supply without performing measurement under the normal condition, and returns to the constantly operating state when reaching a predetermined time and waits for an instruction or a request from the computer 1. In such a state, the sensor terminal 2 performs measurement by the sensor 3 while using the power of the battery 203, transmits the detection signal data to the computer 1, and then, transitions to the sleep state. Alternatively, the following mode can be also adopted. The sensor terminal 2 returns from the sleep state at predetermined set timing and performs measurement using the sensor 3, stores the detection signal data in the memory 202, and then, transitions to the sleep state. When reaching the predetermined time, the sensor terminal 2 returns from the sleep state, performs a process of reading the detection signal data held in the memory 202 and transmitting the detection signal data to the computer 1, and then, transitions to the sleep state again. The timing for communication between the computer 1 and the sensor terminal 2 can be arbitrarily set in consideration of power consumption and the like.

In addition, the following mode can be also adopted. The sensor terminal 2 is activated to perform measurement at a set time, and performs a predetermined process (a simple water leak determination process on the sensor terminal 2 side) with respect to the detection signal data. When determining that there is an abnormality as a result of such a process, the sensor terminal 2 immediately transmits the detection signal data (to which simple water leak determination result information may be attached) to the computer 1. When determining that there is no abnormality as a result of the process, the sensor terminal 2 returns to the sleep state. When receiving the detection signal data from the sensor terminal 2, the computer 1 performs a final water leak determination process.

Regarding the wireless communication between the sensor terminal 2 and the computer 1 or the base station 31, for example, a known low power wide area (LPWA), a low power wide area network (LPWAN), or the like can be applied as a wireless communication scheme with low cost, low power consumption, and a wide range.

The computer 1 calculates a vibration intensity value from the detection signal data of the sensor 3. The invention is not limited thereto, and the sensor terminal 2 may calculate the vibration intensity value from the detection signal data of the sensor 3. The processor 201 of the sensor terminal 2 may perform predetermined arithmetic processing on the detection signal data measured by the sensor 3. Examples of the processing include Fourier transform processing, frequency filter processing, data compression processing, and the like.

[Operation And Process]

Figure 3:
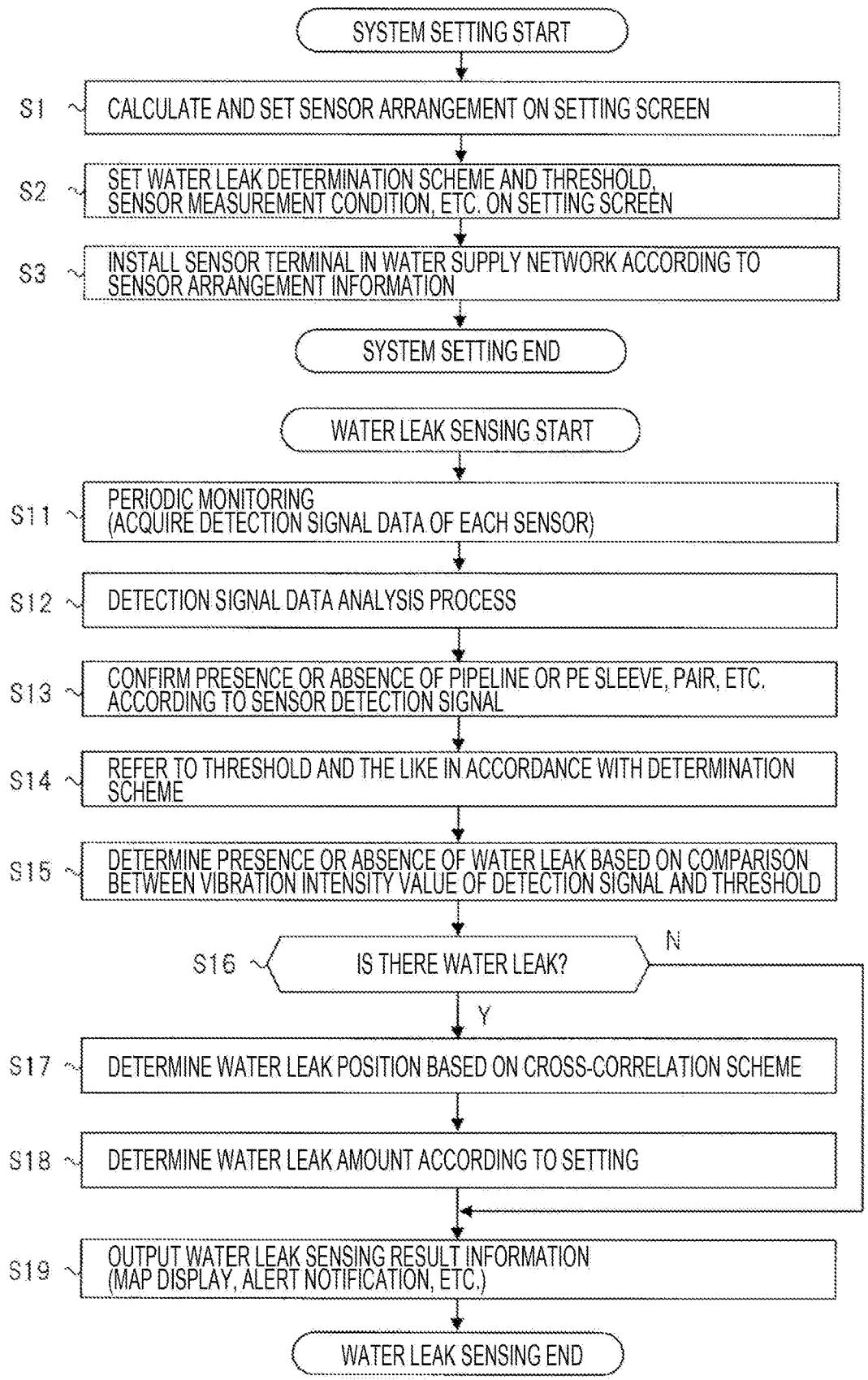
FIG. 3 is a view illustrating flow of main operation and process in the water leak sensing system of the first embodiment.

FIG. 3 illustrates flow of examples of main operation and process of the water leak sensing system 10. First, the flow at the time of system setting is described as follows. At the time of system setting, the user sets, for example, the arrangement of the plurality of sensors 3 (corresponding sensor terminals 2) in the water supply network 40.

In Step S1, the computer 1 displays a sensor arrangement setting field on the setting screen based on the user's operation. The computer 1 calculates arrangement positions of the plurality of sensors 3 (corresponding sensor terminals 2) in the target water supply network 40 based on the user's operation (for example, input of a sensor arrangement calculation instruction), and displays sensor arrangement information as the calculation result in the sensor arrangement setting field as sensor arrangement information to be suggested and recommended to the user. At that time, the computer 1 determines a suitable sensor arrangement based on the pipeline information d2 including the PE sleeve presence/absence information. In the sensor arrangement setting field, for example, information such as the positions of the water control valve 5 and the sensor 3 and the presence or absence of the PE sleeve is displayed on a map of the pipeline of the water supply network 40. In addition, the user confirms the sensor arrangement information in the sensor arrangement setting field, corrects a part of the sensor arrangement information as appropriate, and performs a saving operation when determining to use the sensor arrangement. As the correction, for example, the user can select a desired water control valve from the sensor arrangement information of the computer 1 and switch the presence or absence of the arrangement of the sensor 3. In addition, the user can set and confirm the water leak sensing-possible distance of the sensor 3 or the like in the sensor arrangement setting field. The computer 1 saves such settings in the sensor arrangement information d6. In addition to the automatic determination of the sensor arrangement by the calculation of the computer 1, the user can also manually set arrangements of the sensors 3 one by one on the setting screen.

In Step S2, the user can set conditions, such as a water leak determination scheme to be applied and a threshold thereof, in the other setting item fields of the setting screen. A default threshold is prepared for the threshold. In addition, the user can set a time period, a date and time, and the like of periodic monitoring in the other setting item fields of the setting screen. The computer 1 saves such settings in the setting information d1. The user can set the measurement condition and the like to be applied to each of the sensors 3 in the other setting item fields of the setting screen. The computer 1 saves such settings in the sensor management information d3.

In Step S3, as subsequent work performed by the worker, the plurality of sensor terminals 2 are installed to the water control valves 5 at designated positions of the water supply network 40 according to the above-described set sensor arrangement information. At such a time, the measurement condition of each of the sensors 3, the operation setting (including the setting relating to sleep control) of each of the sensor terminals 2, and the like are also set in advance. For example, the sensor management information or the like may be set in the sensor terminal 2 by communication in which an instruction or information for setting is transmitted from the computer 1 to the sensor terminal 2.

The flow of water leak sensing after the operation is started after the above system setting is described as follows. This flow is repeatedly executed in a loop as periodic monitoring, for example.

In Step S11, the computer 1 acquires and collects detection signal data from the plurality of sensor terminals 2 at regular timing (for example, once a day) according to the setting information d1. At the next communication timing, the computer 1 transmits a request for the detection signal data to the sensor terminal 2. This request includes information such as an ID of the target sensor terminal 2. When receiving the request from the computer 1, the sensor terminal 2 transmits the measured detection signal data or the detection signal data that has been already measured to the computer 1 as a response. The sensor terminal 2 creates a packet including, for example, information such as the ID of the sensor terminal 2 and the detection signal data, transmits the packet by wireless communication, and then, returns to the sleep state. Incidentally, it is also possible to collectively transmit the detection signal data corresponding to a plurality of times of measurement from the sensor terminal 2 to the computer 1. The computer 1 stores the detection signal data received from the sensor terminal 2 in the memory 102 as the detection signal data d4.

Incidentally, the invention is not limited to the periodic monitoring, and it is also possible to transmit a request from the computer 1 to acquire detection signal data at an arbitrary timing when the user inputs a predetermined instruction to the computer 1. That is, it is also possible to perform the water leak sensing at an arbitrary timing set by the user.

In Step S12, the computer 1 performs analysis processing on detection signal data of each of the sensors 3 to obtain information such as a vibration intensity value for a water leak determination. Examples of the analysis processing include known Fourier transform processing, frequency filter processing, and the like.

In Step S13, regarding the detection signal data of each of the sensors 3, the computer 1 confirms information such as a pipeline associated with the sensor 3 (that is, a partial pipeline between the sensors 3 and between the water control valves 5), the water control valve 5, the presence or absence of the PE sleeve 6, and a pair of the sensors 3 (corresponding pair list) and the like based on the pipeline information d2. These pieces of information are used in the following process.

The computer 1 confirms the setting information d1 such as a determination scheme and a threshold, and performs a process of determining presence or absence of a water leak or the like as follows according to the setting information d1. First, the computer 1 refers to the condition such as the threshold relating to the determination scheme from the setting information d1 in Step S14.

In Step S15, the computer 1 compares the vibration intensity value of the detection signal data of each of the sensors 3 with each threshold according to the determination scheme, and determines the presence or absence of the water leak in a target pipeline (that is, a partial pipeline between the sensors 3 and between the water control valves 5). At such a time, the computer 1 determines the presence or absence of the water leak using detection signals of the two adjacent sensors 3 of the pair via the target pipeline.

During the water leak determination, the vibration intensity value of the detection signal of the sensor 3 of the target pipeline is compared with the threshold. As a result, for example, it is determined that "water leak is present" when the vibration intensity value is equal to or more than the threshold, and it is determined that "water leak is absent" when the vibration intensity value is less than the threshold. The state, "water leak is present" indicates a state where it has been determined that there is a high possibility that the water leak occurs in the target pipeline. Conversely, the state, "water leak is absent" indicates a state where it has been determined that there is a low possibility that the water leak occurs in the target pipeline. The computer 1 saves the water leak presence/absence determination result information in the water leak sensing result information d5.

Step S16 is a branch depending on the result of the water leak presence/absence determination. The process proceeds to Step S17 when it is determined that "water leak is present" (S16-Y), and the process proceeds to Step S19 when it is determined that "water leak is absent" (S16-N).

In Step S17, the computer 1 further performs a water leak position determination based on the cross-correlation scheme. The computer 1 performs the water leak position determination using information on the two adjacent sensors 3 forming the pair by the cross-correlation scheme. Incidentally, a well-known technique can be used for this cross-correlation scheme itself, and details thereof will be described later.

At this time, the computer 1 calculates a water leak position in a target partial pipeline determined as "the water leak is present" based on the determination result of Step S15. This water leak position is, for example, the position px of the water leak point PX as illustrated in FIG. 1, and corresponds to the distances X1 and X2 from the positions of the respective sensors 3 (SS1 and SS2) to the position px of the water leak point PX. The computer 1 saves the water leak position determination result information in the water leak sensing result information d5.

In Step S18, the computer 1 further performs a water leak amount determination in the case of the setting in which the water leak amount determination is performed. In the case of the setting in which the water leak amount determination is not performed, the processing of Step S18 can be omitted. When the water leak amount determination is performed, the computer 1 performs a process of determining a water leak amount using the result information of the water leak presence/absence determination in Step S15 and the water leak position determination in Step S17. At that time, when the water leak is present, the computer 1 determines the magnitude of the water leak amount in the target pipeline, for example, roughly in three levels of large, middle, and small, based on a predetermined determination scheme. When the water leak amount determination has been performed, the computer 1 saves water leak amount determination result information in the water leak sensing result information d5.

The signal intensity of the sensor 3 depends on two parameters of the water leak amount and the water leak position (a distance from the water leak point to the sensor 3). Accordingly, as in the present flow, the determination processing is performed in the order of the presence or absence of the water leak (Step S15), the water leak position (Step S17), and the water leak amount (Step S18). When the water leak position has been specified in Step S17, the distance from the water leak position to the sensor 3 is known, and thus, the computer 1 can determine the level of the water leak amount using a threshold taking into consideration the degree of attenuation of the water leak signal in Step S18.

In Step S19, the computer 1 outputs the water leak sensing result information to the user based on the water leak sensing result information d5 including the determination result information of the presence or absence of the water leak, the water leak position, and the like. Specifically, the computer 1 displays a screen (water leak sensing result screen) including the water leak sensing result information. On this screen, for example, information such as a water leak presence/absence state per partial pipeline or area including such a pipeline, positions of the corresponding water control valve 5 and sensor 3, and a water leak amount and a water leak position in the case of the presence of the water leak is displayed on the map of the pipeline of the water supply network 40. In addition, on this screen, enlarged display may be performed in response to user's operation of selecting a partial pipeline or area, and detailed information such as the water leak position may be displayed. In addition, the computer 1 may immediately notify the user of the water leak sensing result information using a voice or a mail as an alert. The computer 1 may perform coping processing such as different alerts in accordance with the level of the water leak amount. Incidentally, the output to the user may be performed only when it is determined that the water leak is present without performing the output to the user when it is determined that there is no water leak.

As a water leak sensing system of a modification, it is also possible to adopt a mode in which only a water leak presence/absence determination is performed and a water leak position determination and the like are not performed. In such a case, when determining that the water leak is present, the computer 1 specifies a pipeline or an area associated with the sensor 3, and outputs information on the pipeline or area to the user as the pipeline or area where the water leak is likely to occur. In addition, the computer 1 may create a graph of detection signal data or a vibration intensity value of the sensor 3 associated with a pipeline determined to have a water leak, for example, and display the graph on the screen.

[Water Supply Network, Setting Screen]

Figure 4:
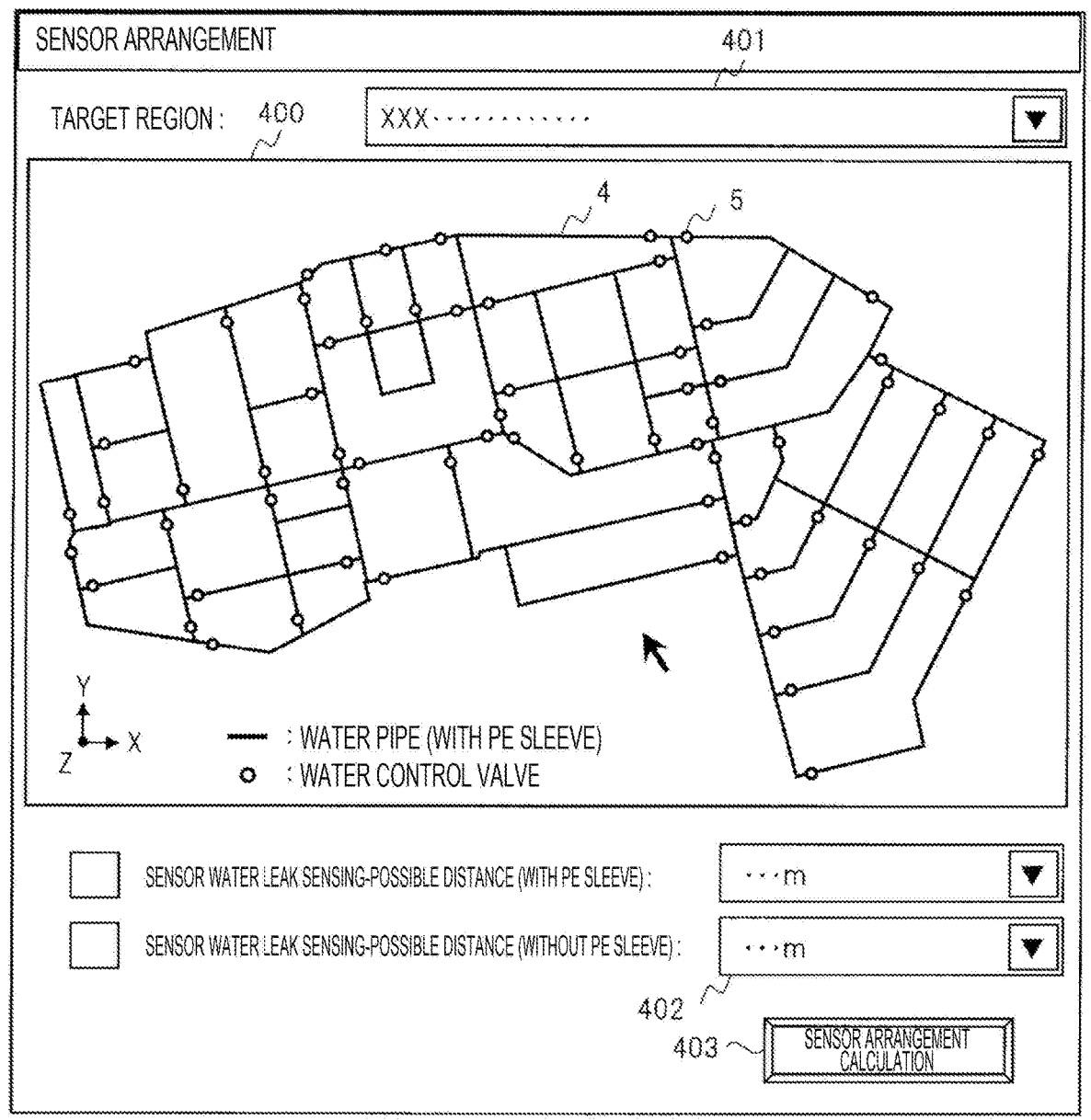
FIG. 4 is a view illustrating a configuration example of a water supply network and an example of a setting screen in the water leak sensing system of the first embodiment.

FIG. 4 illustrates a specific configuration example of a pipeline or the like of a part of the water supply network 40, and in particular, illustrates an example of displaying the pipeline or the like in a setting screen regarding the sensor arrangement provided by the computer 1. The screen of FIG. 4 is an example of the setting screen on which the configuration of the pipeline or the like of the water supply network 40 and the sensor arrangement can be confirmed and set. The screen of FIG. 4 includes a region selection item 401, a map field 400, a sensor distance item 402, and a sensor arrangement calculation button 403. In the region selection item 401, the user can select and designate a target region. In the map field 400, a pipeline network of the target region and a sensor arrangement are displayed based on the pipeline information d2 and the sensor arrangement information d6. Only the pipeline network is displayed in the map field 400 of this example, the water pipe 4 constituting the pipeline network is represented by the black solid line, and the water control valve 5 is represented by the white circle. In this example, a case where the entire pipeline network in this region has the water pipes 4 with PE sleeves is illustrated. In the map field 400, the presence or absence of the PE sleeve for each pipeline or for each area is also displayed by being distinguished with a predetermined expression (for example, a solid line and a broken line, different colors, and the like). Incidentally, it is also possible to display the pipeline network to be superimposed on a general map.

In the sensor distance item 402, a distance corresponding to the presence or absence of the PE sleeve is displayed as the water leak sensing-possible distance of the sensor 3 to be used, and the user can also set the distance. The sensor arrangement calculation button 403 is a button by which the user instructs the computer 1 to calculate the sensor arrangement.

On this screen, the user can confirm the configuration of the pipeline network of the target region, the water leak sensing-possible distance of the sensor 3 to be used, and the like, and presses the sensor arrangement calculation button 403 when desiring to determine the sensor arrangement. In accordance with such an instruction, the computer 1 calculates a suitable sensor arrangement of the plurality of sensors 3 with respect to the target pipeline network, and displays sensor arrangement information in the map field 400.

[Pipeline Information, PE Sleeve Presence/Absence Information]

Figure 5A:
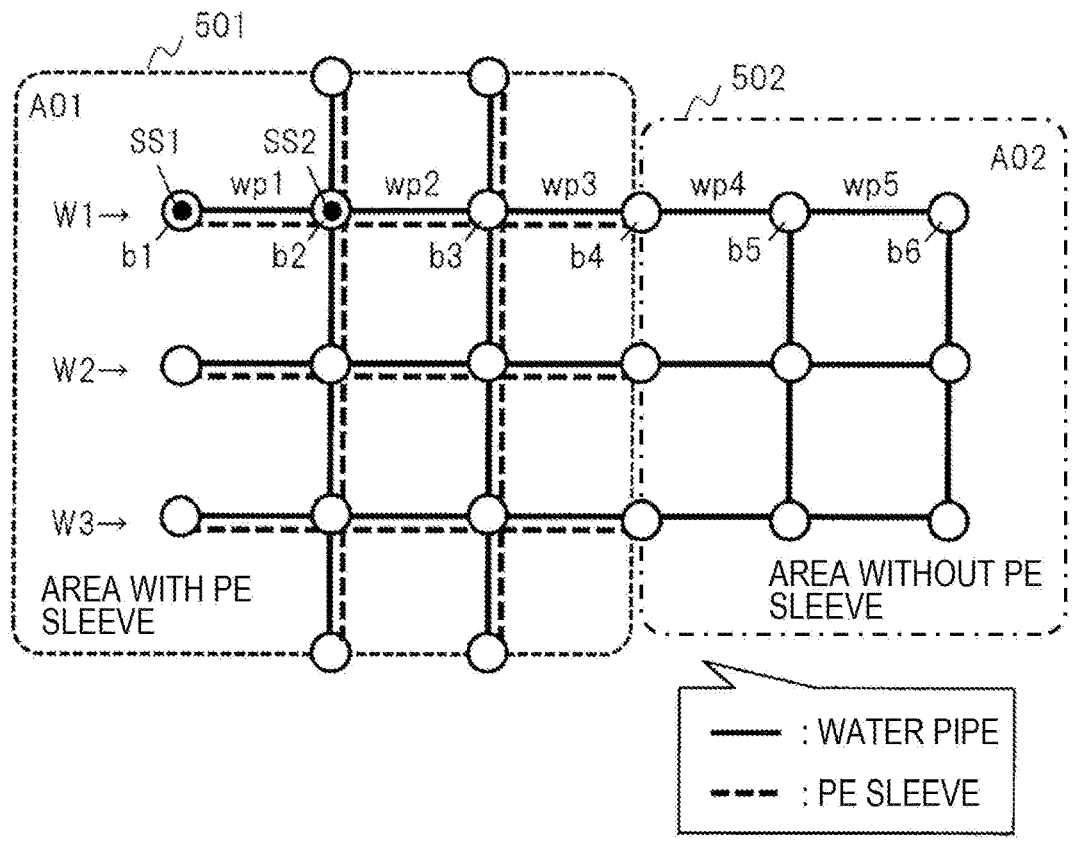
FIG. 5A is a view illustrating a first configuration example of pipeline information including PE sleeve presence/absence information in the water leak sensing system of the first embodiment.
Figure 5B:
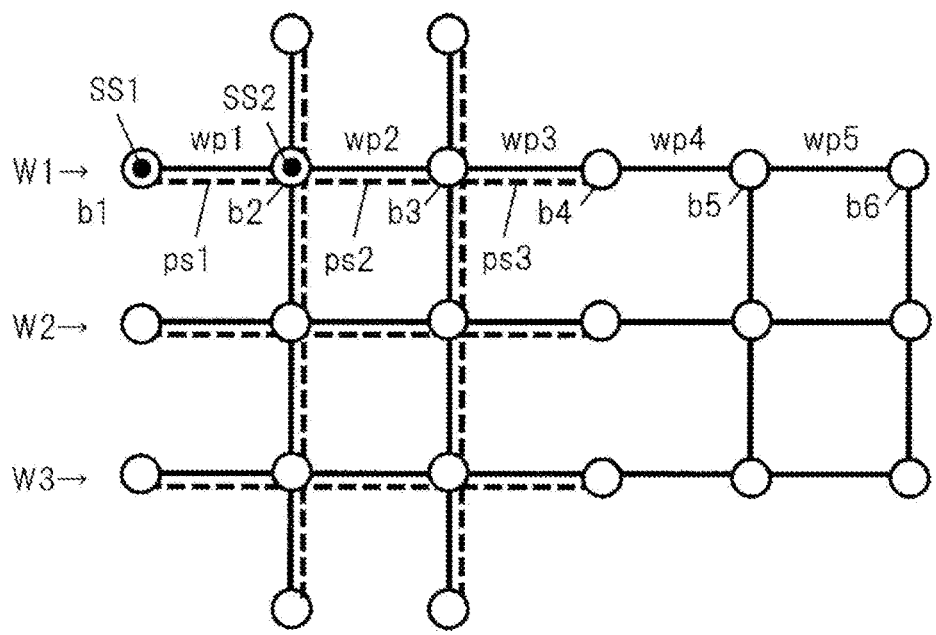
FIG. 5B is a view illustrating a second configuration example of the pipeline information including the PE sleeve presence/absence information in the water leak sensing system of the first embodiment.

FIGS. 5A and 5B illustrate supplementary explanatory views regarding the pipeline information d2. FIG. 5A illustrates an example of a case where PE sleeve presence/absence information is provided for each area in a region as a first configuration example of the pipeline information d2. In this example, the pipeline network is simply illustrated in a matrix shape. Here, the solid line indicates the pipeline of the water pipe 4 and the broken line indicates the PE sleeve 6. The white circle indicates the water control valve 5. In this example, a case where an area 501 including a pipeline with a PE sleeve (area A01) and an area 502 including a pipeline without a PE sleeve (area A02) exist in parallel in the pipeline network of a certain region is illustrated. As a configuration of the pipeline information d2, information on the pipeline and the water control valve 5 included in an area is associated with each area. In the pipeline information d2, the presence or absence of the PE sleeve is set for each area.

For example, a water pipe W1 extending in a certain direction has water pipes wp1, wp2, wp3, wp4, wp5, and the like as partial pipelines. Water control valves b1, b2, b3, b4, b5, b6, and the like are provided as the water control valve 5 on the water pipe W1. The area A01 includes the water pipes wp1, wp2, and wp3 and the water control valves b1, b2, b3, b4, and the like. The area A01 is set as the area 501 with the PE sleeve. The area A02 includes the water pipes wp4 and wp5 and the water control valves b4, b5, b6, and the like. The area A02 is set as the area 502 without the PE sleeve.

FIG. 5B illustrates an example of a case where PE sleeve presence/absence information is provided for each partial pipeline as a second configuration example of the pipeline information d2. For example, in the water pipe W1, a PE sleeve ps1 is installed, as the PE sleeve 6, in the water pipe wp1 connecting the water control valve b1 and the water control valve b2. Similarly, a PE pipe ps2 is installed in the water pipe wp2, and a PE sleeve ps1 is installed in the water pipe wp3. In the pipeline information d2, information such as presence or absence of the PE sleeve and an ID of the PE sleeve is set for each unit of the partial pipeline such as the water pipe wp1.

In the sensor arrangement information d6, presence or absence of an arrangement of the sensor 3 can be set for each of the water control valves 5 based on the pipeline information d2. For example, when the sensor SS1 (corresponding sensor terminal 2) is to be installed in the water control valve b1 (illustrated as the black circle in the white circle), information is held such that an ID and a position of the sensor SS1 are associated with an ID and a position of the water control valve b1. Similarly, when the sensor SS2 is installed in the water control valve b2, information is held such that an ID and a position of the sensor SS2 are associated with an ID and a position of the water control valve b2. In addition, a plurality of pairs are set with two sensors 3 as one pair regarding the cross-correlation scheme. For example, a pair of the sensor SS1 of the water control valve b1 and the sensor SS2 of the water control valve b2 is set in the pair list.

[Problem and the Like]

Next, a description will be given regarding an experiment performed by the present inventor and an examination result relating to the design of the water leak sensing system 10 according to the first embodiment. In addition, a configuration and a problem of a water leak sensing system of a prior art example, a solution devised in the water leak sensing system 10 of the first embodiment and the like will be described.

[Experimental Facility]

Figure 6:
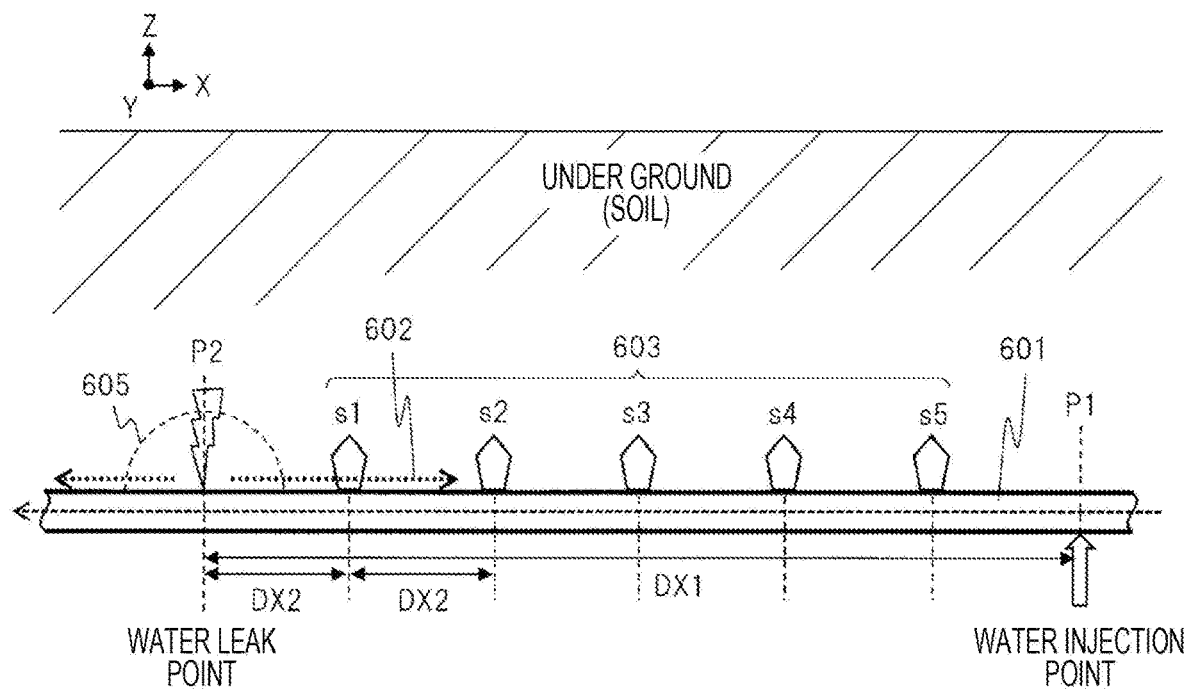
FIG. 6 is a view illustrating a schematic configuration of an experimental facility relating to the water leak sensing system of the first embodiment.

FIG. 6 illustrates an overview of an experimental facility configured for water leak sensing relating to the design of the water leak sensing system 10 of the first embodiment. The present inventor has conducted an experiment on the influence of presence or absence of a pipe covering member in an environment near a pipeline based on the experimental facility as illustrated in FIG. 6. The experimental facility of FIG. 6 has a water pipe 601 buried in the soil under the ground. The water pipe 601 will be also sometimes referred to as a buried pipe, a pipe, a pipeline, or the like. In this example, the water pipe 601 is a single pipeline extending in the horizontal direction (X direction) at a predetermined position in the vertical direction (Z direction) from the ground surface. In an experimental example, the water pipe 601 is configured using a ductile cast iron pipe having a nominal diameter of 100 mm and a length exceeding 100 m.

An experimental water injection point P1 is provided at a predetermined position in the horizontal direction of the water pipe 601. Water is injected into the water pipe 601 from the water injection point P1. An experimental water leak point P2 is provided at a position having a predetermined distance DX1 with respect to the water injection point P1. The water leak point P2 is a place where a pseudo water leak is generated. The water leak point P2 is provided with, for example, a hole, which can be open and closed and has predetermined shape and size, at one place on an outer periphery of the water pipe 601. In the experiment, water is injected from the water injection point P1 at a constant pressure in a state where the hole at the water leak point P2 is closed in advance, and air inside the water pipe 601 is deflated. In a state where the air is sufficiently deflated, a pseudo water leak is generated in an open state of the hole of the water leak point P2. In this example, water flows inside the water pipe 601 in a direction from right to left in the X direction illustrated in FIG. 6. From the water leak point P2, a water leak vibration 602 is transmitted to the left and right in the X direction. In this experimental facility, an environment 605 near an outer periphery of the water leak point P2 is the soil.

In the water pipe 601, a sensor 603 is installed for water leak sensing. The sensor 603 is a vibration sensor, and detects a vibration or a sound transmitted through the water pipe 601. In the experimental facility of FIG. 6, sensors 603 are installed at every position of a predetermined interval of a predetermined distance DX2 in a direction from the water leak point P2 to the water injection point P1 (direction from left to right in the X direction) between the water injection point P1 and the water leak point P2. In this example, the plurality of sensors 603 include sensors s1 to s5. Each of the sensors 603 detects a water leak vibration 602 generated depending on a water leak at the water leak point P2 and transmitted through the water pipe 601. The computer of the water leak sensing system acquires detection signal data from the sensor 603. The computer performs a determination on presence or absence of a water leak in the water pipe 601, prediction of a water leak amount, a determination of a water leak position, and the like by analyzing the signal.

In the actual operation, the sensor is not installed on the surface of the water pipe buried in the ground, but the sensor 3 is installed to the water control valve 5 as described above due to the ease of installation and access. The influence on the vibration detection due to a difference of whether the installation place of the sensor is the water pipe or the water control valve is extremely little as compared to the influence due to the water leak, and thus, can be ignored. In addition, both ends of the water pipe 601 in FIG. 6 are open, and water flows from right to left in the X direction, but the influence on vibration detection due to a difference in the direction of the water flow is also extremely little, and thus, can be ignored.

[PE Sleeve (Pipe Covering Member)]

Figure 7:
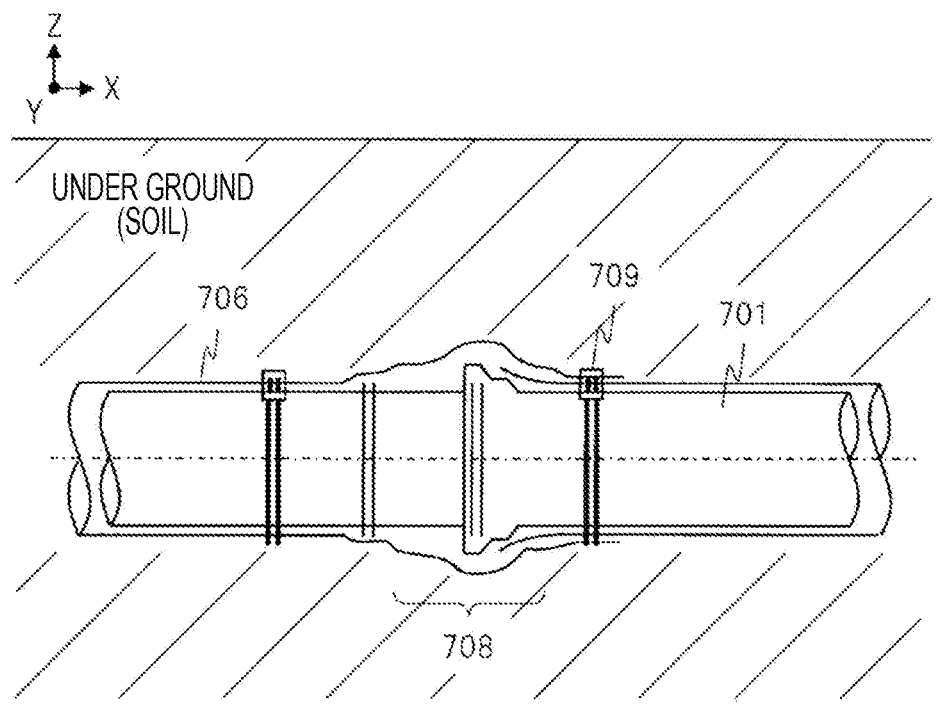
FIG. 7 is a view illustrating an installation configuration example of a PE sleeve, which relates to the water leak sensing system of the first embodiment.

FIG. 7 illustrates an installation example of a PE sleeve with respect to a water pipe, which is a known technique. The PE sleeve is a pipe covering member that realizes prevention of pipe corrosion and the like by blocking direct contact between the pipe and the soil. FIG. 7 illustrates particularly an installation overview of a PE sleeve 706 near a bonding portion 708 between pipeline members forming a partial pipeline of a water pipe 701 as each part of the water pipe 701 and the PE sleeve 706 buried in the soil in the ground in a vertical cross section. An outer peripheral surface of the water pipe 701 is covered with the PE sleeve 706. The outer peripheral surface of the water pipe 701 and an inner surface of the PE sleeve 706 are substantially in close contact with each other so as to prevent entry of soil or groundwater. The members of the PE sleeves 706 in the X direction are fixed around the water pipe 701 such that soil and moisture do not enter from the outside using a rubber band and a fastener 709. The PE sleeve 706 is provided with a slack near the bonding portion 708 including a joint of the water pipe 701 in order to prevent breakage.

Regarding a ductile cast iron pipe, which is a water pipe buried in the ground in Japan, "JCPA Z 2005" (polyethylene sleeve standard for ductile iron pipe corrosion prevention) was enacted in 1975, and the application of the PE sleeve was started as a corrosion prevention measure. However, actual application period and application policy of the PE sleeve differ in each local government that manages water and sewage. That is, the presence and absence of the installation of the PE sleeve are mixed in water pipes of the respective regions of the respective local governments. In the region where the PE sleeve is applied, the water pipe 701 is covered by the PE sleeve 706 and buried in the ground when being installed as illustrated in FIG. 7. As a result, the water pipe 701 is prevented from coming into direct contact with the surrounding soil and moisture, and a corrosion preventing effect is obtained. As a result, the occurrence of a water leak caused by corrosion has decreased in a pipeline network where the PE sleeve is installed. However, even after burial of the water pipe with the PE sleeve, there is a possibility of, for example, breakage of the PE sleeve due to another construction such as gas construction and branching/expansion construction, loosening or a crack of the PE sleeve due to an earthquake, or the like. There is a need for water leak sensing since it is difficult to prevent the water leak accompanying such problems.

[Experimental Finding (1)—Environment and Characteristic Near Water Leak Point]

Figure 8A:
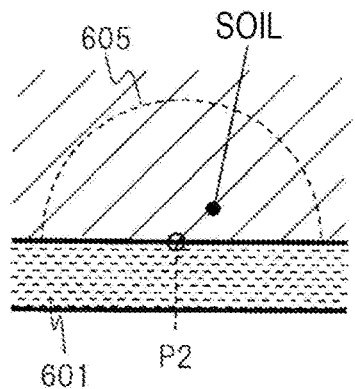
FIG. 8A is a view illustrating a first example of an environment and a state near a water pipe, which relates to the water leak sensing system of the first embodiment.
Figure 8B:
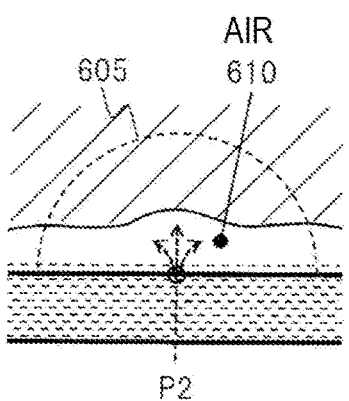
FIG. 8B is a view illustrating a second example of the environment and state near the water pipe, which relates to the water leak sensing system of the first embodiment.
Figure 8C:
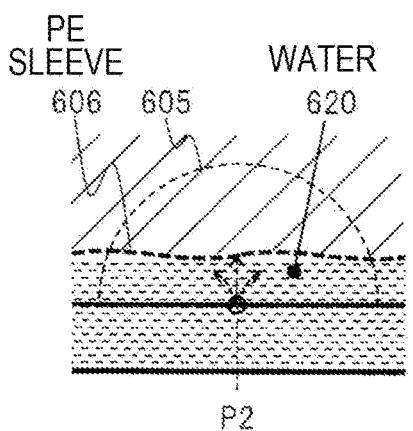
FIG. 8C is a view illustrating a third example of the environment and state near the water pipe, which relates to the water leak sensing system of the first embodiment.

The present inventor has obtained the following finding as a result of an experiment of water leak sensing using the above-described experimental facility. First, a difference was found in a vibration intensity detected by the sensor 603 depending on a difference in an environment near the water leak point P2 of the water pipe 601. For example, the vibration intensity was significantly different between a case where the environment near the water leak point P2 of the water pipe 601 changes from soil to air and a case where the environment changes from soil to water. FIGS. 8A, 8B, and 8C illustrate the difference in the environment near the water leak point P2 and a difference in characteristic of a water leak.

FIG. 8A illustrates a state where there is no water leak in the environment 605 near the water leak point P2, and an outer peripheral surface of the water pipe 601 is in contact with soil so as to be covered by only the soil. The state of FIG. 8A corresponds to the case where the pipeline is not provided with the PE sleeve.

FIG. 8B illustrates a state where the soil in the vicinity is further removed by a water leak from the state of FIG. 8A and a space of air 610 is created. In this state, most of leaked water from the water leak point P2 of the water pipe 601 is released into the air 610, and this state will be described as an environment of "release to air" for the sake of description.

FIG. 8C illustrates a case where a PE sleeve 606 as a pipe covering member is present in the vicinity and at an outer periphery of the water leak point P2 of the water pipe 601 as an environment 605 different from that of FIG. 8B. When being buried, the water pipe 601 is covered with soil after the outer periphery thereof is covered with the PE sleeve 606. The state in FIG. 8C is a state where leaked water from the water pipe 601 is accumulated in a space between the outer periphery of the water pipe 601 and the PE sleeve 606 so that the space is filled with water 620. In this state, most of the leaked water from the water leak point P2 of the water pipe 601 is released to the water 620, and this state will be described as an environment of "release to water" for the sake of description.

The present inventor has measured a vibration intensity using the sensor 603 based on the above-described experimental facility for the case of the environment 605 without the PE sleeve as illustrated in FIGS. 8A and 8B and the case of the environment 605 with the PE sleeve as illustrated in FIG. 8C. In specific experimental results, vibration intensities of signals detected by the sensor 603 at the same distance from the water leak point P2 with the same water leak amount were compared. In this case, the vibration intensity was higher by one digit or more in the environment of "release to water" with the PE sleeve in FIG. 8C than in the environment of "release to air" without the PE sleeve in FIG. 8B.

The fact that the vibration intensity of the signal of the sensor 603 is high means that it is easy to detect a water leak by that much. In other words, this means that an arrangement distance (water leak sensing-possible distance) from the water leak point to the sensor 603 can be made longer and farther when detecting the same level of vibration intensity. That is, this means that the arrangement density of the sensors 603 can be made lower and the number of the sensors 603 that need to be installed can be reduced in the case of the pipeline with the PE sleeve.

[Experimental Finding (2)—Water Leak Sensing-Possible Distance]

Figure 9:
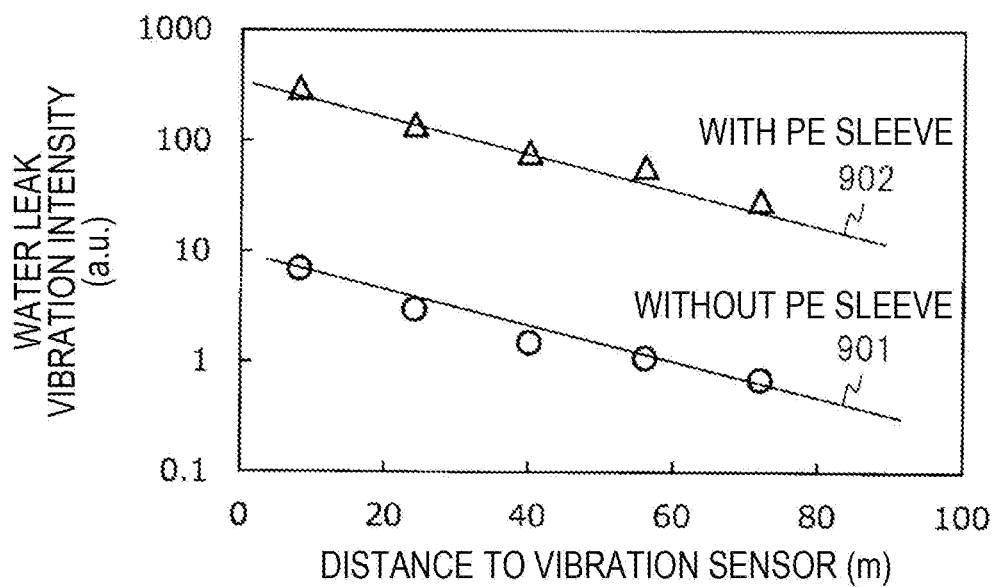
FIG. 9 is a graph illustrating a comparison of a water leak vibration intensity depending on presence or absence of a PE sleeve in an experimental example, which relates to the water leak sensing system of the first embodiment.

FIG. 9 illustrates a comparison of a water leak vibration intensity depending on the presence or absence of the PE sleeve in the result of the above experiment. FIG. 9 is a graph representing a relationship between a distance [m] from the water leak point P2 to each of the sensors 603 in FIG. 6 and a vibration intensity [arbitrary unit] of a water leak, and illustrates a comparison between the presence and absence of the PE sleeve 606 near the water leak point P2. The comparison is made under the same condition such as the same water leak amount. The distance on the horizontal axis of the graph corresponds to the water leak sensing-possible distance of the sensor 603. A straight line 901 indicates a characteristic in the case of a pipeline without a PE sleeve. A straight line 902 indicates a characteristic in the case of a pipeline with a PE sleeve. As apparent from FIG. 9, it has been found that the vibration intensity becomes higher by one digit or more in the case of presence of the PE sleeve than the case of absence of the PE sleeve. With the same water leak amount, it was found that the vibration intensities differed in magnitude by one digit or more depending on the presence or absence of the PE sleeve between the sensors 603 located at the same distance from the water leak point. For example, when compared to a sensor located at a distance of 40 m in FIG. 9, a vibration intensity is about 1 in the straight line 901 without the PE sleeve and is about 100 in the straight line 902 with the PE sleeve, and a difference of about 2 digits was found.

In other words, as compared to the pipeline without the PE sleeve under the same water leak amount condition, an arrival distance until the water leak vibration from the water leak point becomes the same constant vibration intensity is significantly extended in the case of the pipeline with the PE sleeve. That is, as compared to the case where the sensor is arranged in the pipeline without the PE sleeve, the distance from the water leak point to the sensor can be made longer and farther in the case of arranging the sensor is arranged in the pipeline with the PE sleeve. This distance is a distance (water leak sensing-possible distance) that enables detection of a vibration intensity sufficient for sensing.

[Experimental Finding (3)—Water Leak Characteristic with Lapse of Time]

In addition, the following finding was obtained regarding a change of a characteristic of occurrence of a water leak accompanying a lapse of time. In the case of the environment 605 without the PE sleeve as in FIG. 8A, the soil around the water pipe 601 is not scraped too much at an early stage of occurrence of the water leak, and thus, it is considered that there is a characteristic that a water leak vibration is transmitted through the soil, which becomes a characteristic close to the release to water. At a stage where the water leak has progressed after a lapse of a certain degree of time since the occurrence of the water leak, it is considered that there is a characteristic of the release to air as illustrated in FIG. 8B. The vibration intensity of the detection signal of the sensor is relatively high at the initial stage, and is relatively low during the subsequent period of the release to air, and gradually decreases. The vibration intensity changes from high to low from the early stage to the middle stage of the water leak. Thus, there is also a possibility that the computer erroneously determines that an analysis result of the sensor signal is not the water leak but noise. That is, conventionally, the water leak sensing accuracy is sometimes lower than that in the case of the environment in the case of the environment without the PE sleeve than in the case of the environment with the PE sleeve.

As illustrated in FIG. 8C, in the case of environment 605 with the PE sleeve, the water leak is released to the air between the PE sleeve 606 around the water pipe 601 and the water pipe 601 in an early stage of occurrence of a water leak, and thus, it is considered that there is a characteristic close to the release to air. At a stage where the water leak has progressed after a lapse of a certain degree of time since the occurrence of the water leak, it is considered that there is a characteristic of the release to water as illustrated in FIG. 8C. The vibration intensity of the detection signal of the sensor is relatively low at the initial stage, and is relatively high during the subsequent period of the release to water.

Figure 10:
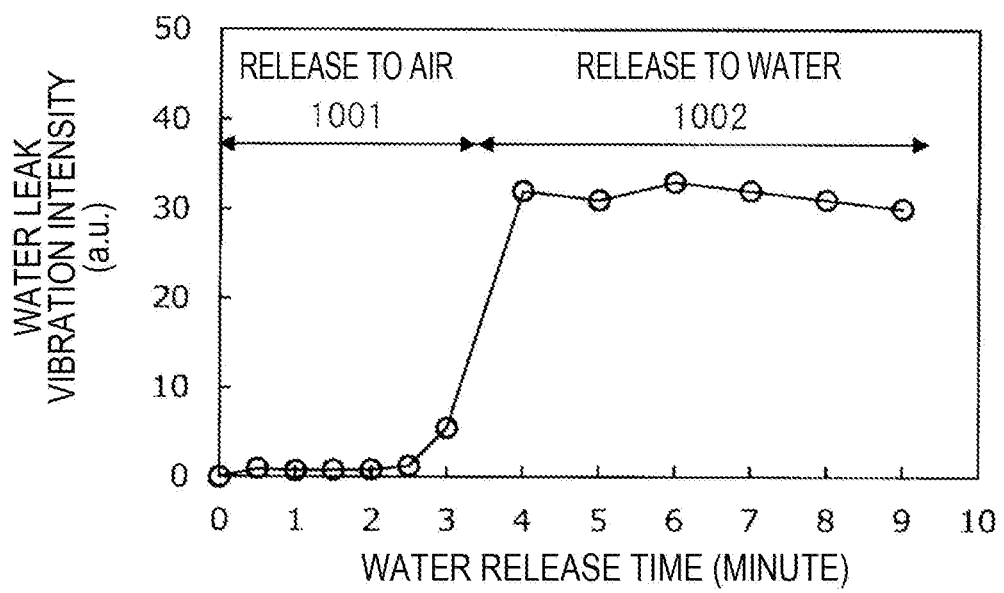
FIG. 10 is a graph illustrating a temporal change of the water leak vibration intensity in the case of the presence of the PE sleeve in the experimental example, which relates to the water leak sensing system of the first embodiment.

FIG. 10 illustrates a temporal change of the water leak vibration intensity in the water leak experiment result in the case of the pipeline with the PE sleeve as illustrated in FIG. 8C. FIG. 10 illustrates an example using the sensor 603 located at a distance of 72 m from a water leak point. The horizontal axis of a graph in FIG. 10 represents a water release time [minutes], and the vertical axis represents the water leak vibration intensity [arbitrary unit]. FIG. 10 illustrates how the water leak changes in a relatively short time unit such as a minute unit. The graph in FIG. 10 is obtained by plotting vibration intensities of signals detected by the sensor 603 at each fixed time of the water release time from a time when the water leak point is open to start a pseudo water leak.

As illustrated in FIG. 10, a period 1001 (for example, about 0 to 3 minutes) at the early stage of occurrence of the water leak corresponds to the characteristic of the release to air, and a subsequent period 1002 corresponds to the characteristic of the release to water as illustrated in FIG. 8C. A vibration intensity in the period 1001 at the early stage of occurrence of the water leak is extremely low. When exceeding a predetermined time (for example, about 3 minutes to 4 minutes) from a start time, the vibration intensity increases rapidly, and the vibration intensity has a certain magnitude in the period 1002.

As a result of investigating such a phenomenon depending on the environment with or without the PE sleeve in detail, the present inventor has found that the above phenomenon such as the rapid change in vibration intensity is manifested due to a change of the characteristic of the water leak from the above-described characteristic of the release to air to the characteristic of the release to water. That is, since the air 610 exists between the water pipe 601 and the PE sleeve 606 in the period 1001 in the early stage of the water leak, there is the characteristic of the release to air so that the vibration intensity is low. In the period 1002 after the predetermined time, since the space between the water pipe 601 and the PE sleeve 606 is filled with the water 620 of the leaked water as illustrated in FIG. 8C, and thus, there is the characteristic of the release to water so that the vibration intensity becomes high.

Cavitation occurs at the water leak point P2 in FIGS. 8B and 8C. The cavitation is a phenomenon in which generation and disappearance of bubbles occur in a short time due to a pressure difference in flow of a liquid, and is also called a cavity phenomenon. The cavitation at the water leak point P2 serves as a generation source of a water leak vibration. In the case of the environment of the release to air as illustrated in FIG. 8B, it is considered that air bubbles taken into the periphery of the hole of the water leak point P2 significantly attenuate the vibration of cavitation. On the other hand, in the case of the environment of the release to water as illustrated in FIG. 8C, it is considered that the attenuation of the cavitation vibration is significantly suppressed since the air is not introduced near the hole of the water leak point P2. Thus, the difference in magnitude of the water leak vibration intensity is generated as described above between both the environments.

In the environment where the PE sleeve is absent as illustrated in FIG. 8B, the soil is scraped due to the water leak so that a cavity is generated relatively immediately, which results in the characteristic of the release to air. Although the time for generation of the cavity also differs depending on a type of soil, the cavity is formed after a certain period of time or longer. When the water leak is left for a long time, a large cavity is formed, and there is a risk that the cavity causes a serious accident such as ground subsidence.

[Cost, Construction Determination Water Leak Amount]

When the water leak sensing system is applied in management of the water supply network of the local government, it is possible to sense a water leak early and to suppress damage. Conventionally, a water service bureau of each local government has conducted water leak sensing work and water leak repair work when a water leak is sensed as the maintenance operation of the water supply network. Manual work and construction require labor, cost, and the like. Therefore, it is advantageous to support the work with the water leak sensing system and to reduce the labor, cost, and the like.

The local government and a water supply management system thereof manage and hold the configuration of the water supply network as pipeline information. In addition, the local government and the water supply management system thereof control a flow rate of a pipeline using a water control valve, and grasp a water leak amount and the like by an inspection and sensing. If the local government decides to conduct maintenance and construction at a stage where the water leak amount is very small at the early stage of the water leak, cost will be enormous. Accordingly, the local government normally sets an optimal value of a water leak amount that minimizes the cost including maintenance and construction as a water leak amount at which requires maintenance and construction need to be performed (sometimes referred to as a construction determination water leak amount). The construction determination water leak amount differs depending on the local government.

Even when the local government introduces and operates a water leak sensing system that can automatically detect a water leak, it is desired to reduce the cost including initial investment cost as much as possible. For example, when a device such as the above-described sensor for water leak sensing is installed in the water supply network, the water leak sensing system of the prior art example requires a large number of sensors. The water leak sensing system of the prior art example does not utilize information on presence or absence of a pipe covering member of a pipeline network. A plurality of sensors in the water leak sensing system of the prior art example are arranged implicitly as sensors having detection characteristics on the premise of a pipeline without a PE sleeve. The sensor is assumed to have a relatively short water leak sensing-possible distance on the premise of the pipeline without the PE sleeve. In the pipeline network, the plurality of sensors are arranged with the relatively short inter-sensor distance. Therefore, a large number of sensors are arranged in the pipeline network. Accordingly, there is a problem in terms of cost.

[Water Leak Amount and Water Leak Sensing-Possible Distance]

Figure 11:
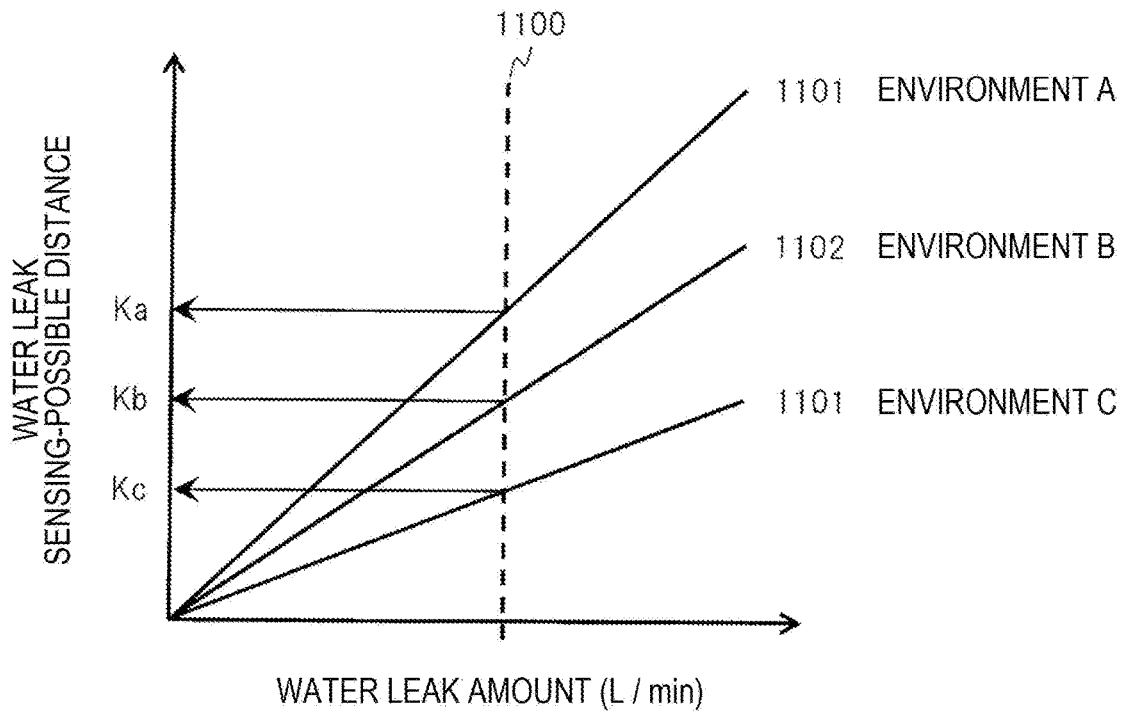
FIG. 11 is a graph illustrating a relationship between a water leak amount and a water leak sensing-possible distance, which relates to the water leak sensing system of the first embodiment.

FIG. 11 illustrates a relationship between the water leak amount [L/min] and the water leak sensing-possible distance. A graph of FIG. 11 illustrates that a water leak sensing-possible distance by the sensor 603 from the water leak point P2 differs depending on the water leak amount and depending on an environment of a pipeline. A water leak amount 1100 corresponds to, for example, a construction determination water leak amount of a certain local government. In this example, environments A, B, and C are compared as different installation environments regarding the water pipe 601. A straight line 1101 indicates a characteristic in the environment A, a straight line 1102 indicates a characteristic in the environment B, and a straight line 1103 indicates a characteristic in the environment C. Inclinations of the straight lines of the characteristics become large to small in the order of the environments A, B, and C. In this example, with the certain water leak amount 1100, the water leak sensing-possible distance of the sensor 603 is set as distances Ka, Kb, and Kc (Ka>Kb>Kc). The water leak sensing-possible distance Kc in the environment C is the shortest, and the water leak sensing-possible distance Ka in the environment A is the longest. Although each installation environment exists in various manners, for example, the environment A corresponds to the above-described pipeline with the PE sleeve.

The water leak sensing system 10 according to the first embodiment calculates and determines the arrangement positions of the plurality of sensors 3 in the water supply network 40 in view of the water leak sensing-possible distance of the sensor 603 in accordance with such an installation environment. A range having a radius corresponding to a water leak sensing-possible distance regarding one sensor 3 installed at a position of a certain water control valve 5 serves as a basic water leak sensing-possible range. When it is desired to cover water leak sensing for all pipelines, positions of the plurality of sensors 3 are selected such that all the target pipelines are included in the water leak sensing-possible range. Even if some pipelines do not fall within the water leak sensing-possible distance and range of the sensors 3, it is possible to sense a water leak or estimate a water leak with equivalent accuracy from determination results using the plurality of sensors 3.

The computer 1 of the water leak sensing system 10 according to the first embodiment uses the pipeline information d2 including the PE sleeve presence/absence information when calculating the sensor arrangement. The water leak sensing system 10 according to the first embodiment may acquire and refer to pipeline information held and disclosed by the water supply management system of the local government, or corresponding pipeline information may be newly input. More specifically, the pipeline information d2 also includes information on a type, a material, a pipe diameter, a joint type, and the like of a pipe and such information is also referred to as a condition during the determination. The water leak sensing system 10 according to the first embodiment particularly refers to the PE sleeve presence/absence information to set the water leak sensing-possible distance and the like of the sensor 3, and thus, can determine the suitable sensor arrangement position.

As described above, the vibration intensity is higher by, for example, one digit in the case of the pipeline with the PE sleeve as compared to the pipeline without the PE sleeve, in the case of the sensor located at the same distance from the water leak point with the same water leak amount in the specific experimental example. In other words, it is possible to set the water leak sensing-possible distance from the water leak point to a significantly long distance corresponding to one digit, as the sensor arrangement, in the case of the pipeline with the PE sleeve as compared to the pipeline without the PE sleeve, with the same water leak amount. That is, the plurality of sensors 3 can be arranged with a corresponding long inter-sensor distance and a low density in the target water supply network 40. Accordingly, the number of sensors to be installed can be reduced and the water leak sensing can be realized at low cost.

[Water Leak Presence/Absence Determination Scheme]

Examples of a water leak presence/absence determination scheme of the water leak sensing system include a scheme in which whether a water leak vibration intensity detected by the sensor 603 exceeds a predetermined threshold and whether the time for which the detected water leak vibration intensity exceeds the threshold has continued for a predetermined time or longer are determined, and it is determined that a water leak has occurred (water leak is present) when the time has continued for the predetermined time or longer.

Figure 12:
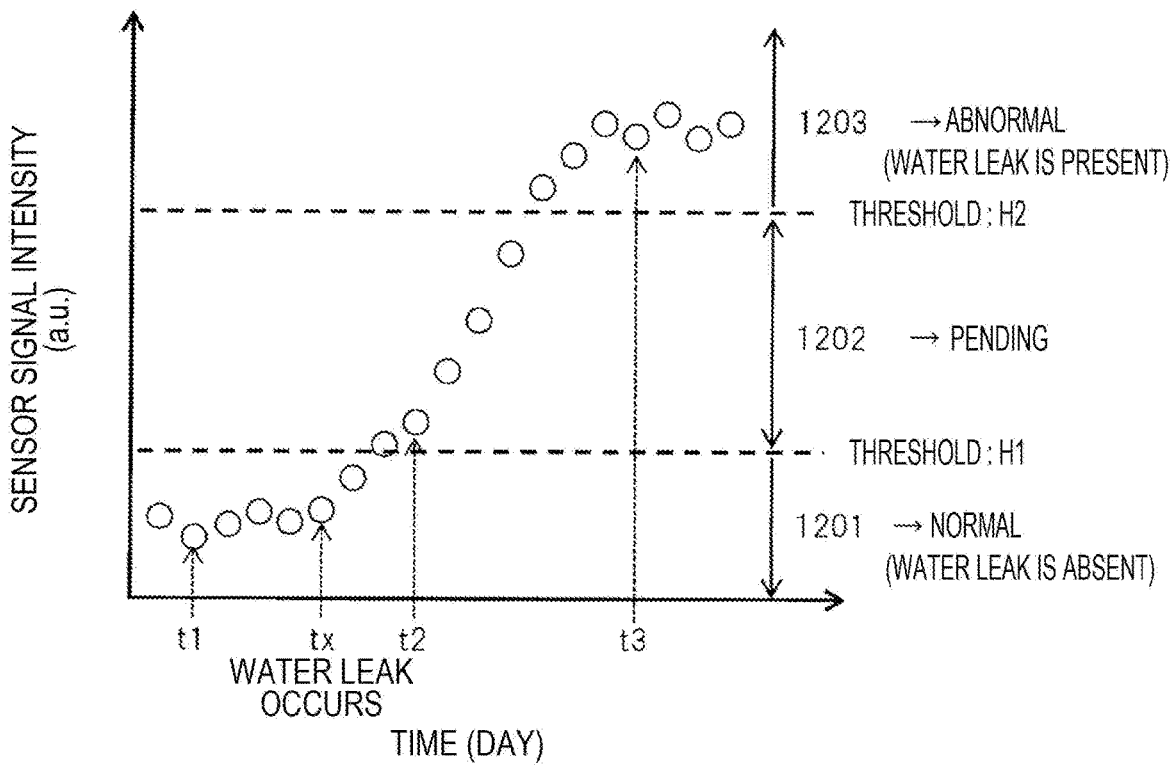
FIG. 12 is a view illustrating an example of a water leak presence/absence determination scheme, which relates to the water leak sensing system of the first embodiment.

FIG. 12 illustrates a scheme in which a signal of the sensor 603 (corresponding sensor 3) is compared with a threshold, as an example of the water leak presence/absence determination scheme. The water leak sensing system 10 according to the first embodiment can apply such a water leak presence/absence determination scheme. In a graph of FIG. 12, the horizontal axis represents a time [day], and the vertical axis represents a vibration intensity of a detection signal of a sensor [arbitrary unit]. FIG. 12 illustrates how the water leak changes in a relatively long time unit such as a day unit.

In the water leak sensing system 10 according to the first embodiment, the water leak sensing sensor 3 (corresponding sensor terminal 2) is permanently installed in the water control valve 5 at a selected position of the water pipe 4. The water leak sensing system 10 periodically monitors detection signal data of the sensor 3 to perform a water leak determination in order to automatically sense a water leak. Therefore, the sensor 3 is installed in the form of being incorporated in the sensor terminal 2 having a wireless communication function. The computer 1 of the water leak sensing system 10 periodically acquires the detection signal data from the sensor terminal 2. In the water leak presence/absence determination scheme of this example, the computer 1 of the water leak sensing system 10 compares a vibration intensity value in the detection signal data of the sensor 3 with a predetermined threshold to determine the presence or absence of the water leak.

In the example of the water leak presence/absence determination scheme in FIG. 12, a threshold H1 and a threshold H2 are set in advance as the threshold. The computer 1 determines that the signal intensity is normal, that is, there is no water leak when the signal intensity is within an area 1201 lower than the threshold H1. If the signal intensity is within an area 1203 equal to or higher than the threshold H2, the computer 1 determines that the signal intensity is abnormal, that is, there is a water leak. If the signal intensity is within an area 1202 of the threshold H1 or higher and lower than the threshold H2, the computer 1 determines pending, that is, that it is difficult to determine the presence or absence of the water leak.

The threshold H2 is set so as to correspond to the construction determination water leak amount. For example, it is assumed that a water leak occurrence time is time tx. The signal intensity increases along with a lapse of time from the time tx, and exceeds the threshold H1 and the threshold H2. For example, a monitored signal intensity is determined at each time such as time t1, t2, t3, or the like. For example, since the intensity exceeds the threshold H2 at the time t3, it is determined that the water leak is present.

In the water leak sensing system of the prior art example, the PE sleeve presence/absence information is not utilized for the setting of each threshold regarding such a water leak sensing determination scheme. That is, in the water leak sensing system of the prior art example, each threshold is set to a predetermined value regardless of the presence or absence of the PE sleeve. In the prior art example, when there is a water leak caused in the pipeline without the PE sleeve and a water leak caused in the pipeline with the PE sleeve, these water leaks are determined by the same scheme using the same threshold, and thus, there is room for improvement in terms of water leak sensing accuracy. The threshold in the prior art example is set only to one of a threshold assuming the environment without the PE sleeve and a threshold assuming the environment with the PE sleeve, and thus, a water leak in the environment that is not assumed is determined with low accuracy. On the other hand, in the water leak sensing system 10 of a second embodiment to be described later, PE sleeve presence/absence information is utilized to determine presence/absence of a water leak and the like using different thresholds depending on presence and absence of a PE sleeve, and thus, it is possible to increase determination and sensing accuracy.

[Water Leak Amount Determination Scheme]

Figure 13:
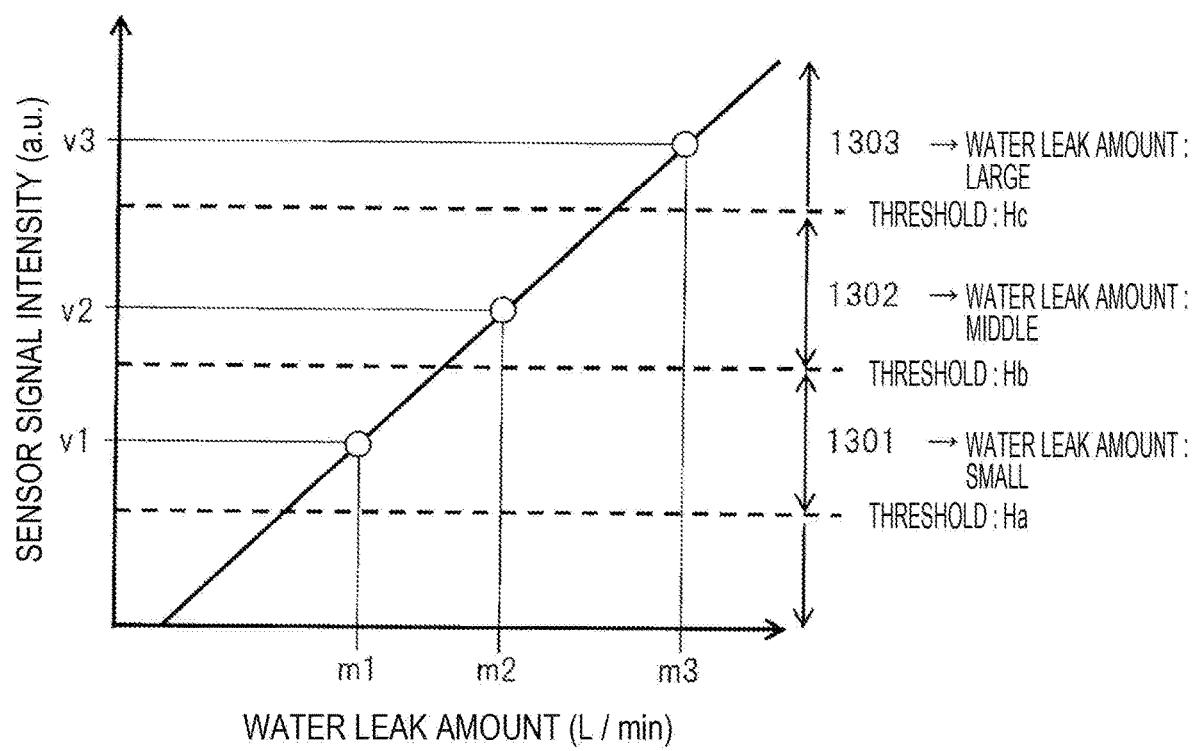
FIG. 13 is a graph illustrating an example of a water leak amount determination scheme, which relates to the water leak sensing system of the first embodiment.

FIG. 13 further illustrates a water leak amount determination scheme. This water leak amount determination is a rough prediction of a water leak amount when a water leak is present. This water leak amount determination scheme is a scheme in which not only the presence or absence of the water leak is determined with one threshold or two thresholds (FIG. 12) but also the water leak amount is determined by, for example, roughly dividing the magnitude of the water leak amount into three levels of large, middle, and small and using three thresholds and ranges corresponding to the respective magnitudes. The water leak sensing system 10 according to the first embodiment adopts such a water leak amount determination scheme as a basis.

In the water leak sensing system 10 according to the first embodiment and the like, it is necessary to first perform a water leak position determination to calculate the influence of attenuation of a signal intensity caused by the distance when the water leak amount determination is performed as described above (FIG. 3). The signal intensity of the sensor 3 is a function of the water leak amount and the distance. For example, when a second determination scheme to be described later is adopted, the water leak amount determination is performed in the following processing order. (1) The computer 1 analyzes signals of two sensors 3 of a pair and calculates the distance relating to the water leak position (distance from the water leak point to each of the sensors 3). (2) The computer 1 calculates the water leak amount in accordance with the presence or absence of the PE sleeve (for example, the water leak amount corresponding to the pipeline without the PE sleeve) in consideration of an attenuation rate caused by the calculated distance. (3) The computer 1 multiplies a detection signal by a coefficient in accordance with the presence or absence of the PE sleeve to correct the water leak amount.

The above sensor signal intensity in the area 1203 higher than the threshold H2 illustrated in FIG. 12 has a positive correlation with the water leak amount if the water leak point is the same. When the magnitude of the water leak amount in the case of the presence of the water leak is determined, it is possible to use a scheme in which a plurality of thresholds are used as illustrated in FIG. 13. In a graph of FIG. 13, the horizontal axis represents a water leak amount [L/min], and the vertical axis represents a sensor signal intensity [arbitrary unit]. In this example, a threshold Ha, a threshold Hb, and a threshold Hc are set in advance in the order from small to large (Ha<Hb<Hc) as the three thresholds configured to determine the water leak amount roughly with the three levels of large, middle, and small in the computer 1. A range 1301 is a range equal to or larger than the threshold Ha and smaller than the threshold Hb, and represents a level at which the water leak amount is relatively small. A range 1302 is a range equal to or larger than the threshold Hb and smaller than the threshold Hc, and represents a level at which the water leak amount is relatively middle. A range 1303 is a range equal to or larger than the threshold Hc, and represents a level at which the water leak amount is relatively large.

For example, after or during the water leak presence/absence determination, the computer 1 of the water leak sensing system 10 according to the first embodiment compares a vibration intensity value of detection signal data with these thresholds when the water leak is present, and determines the water leak amount (in other words, the water leak amount level) by determining any range to which the vibration intensity value corresponds. For example, when the vibration intensity has a value v1, the value falls within the range 1301, and thus, it is determined that the water leak amount in the case where the water leak is present is the small level.

In the water leak sensing system of the prior art example, the PE sleeve presence/absence information is not utilized for such a water leak amount determination scheme and setting of the threshold thereof, and a predetermined value is set for each threshold regardless of the presence or absence of the PE sleeve of the pipeline. In this case, there is a possibility that the water leak sensing accuracy is lowered as follows. The computer of the prior art example uses detection signal data obtained by a sensor not assuming presence or absence of a PE sleeve, for example, a sensor on the premise that there is no PE sleeve, as a pipeline sensor. A water leak sensing-possible distance according to an arrangement of such a sensor is a distance not assuming the presence or absence of the PE sleeve, for example, a relatively short distance on the premise that there is no PE sleeve. The computer compares a vibration intensity value in the detection signal data of the sensor with a predetermined threshold to determine presence or absence of a water leak and a water leak amount level. This threshold is a predetermined threshold corresponding to the water leak sensing-possible distance of the sensor, and is the same regardless of the presence or absence of the PE sleeve. However, there is a possibility that the characteristic regarding the water leak vibration differs between the case where the PE sleeve is present near the water leak point of the pipeline and the case where the PE sleeve is absent as described above. This computer determines the presence or absence of the water leak, and the like under the same conditions including the same threshold with respect to the environment and characteristic of any water leak with or without the PE sleeve. Therefore, there is a case where the water leak sensing accuracy is lowered. For example, when a determination is performed by applying a threshold on the premise that there is no PE sleeve to a detection signal when a PE sleeve is present near a water leak point, there is a possibility of an erroneous determination or sensing delay of presence or absence of the water leak, erroneous estimation of magnitude of a water leak amount, or the like.

On the other hand, in the first determination scheme, for example, in the water leak sensing system 10 according to the second embodiment to be described later, different thresholds are applied in accordance with the presence or absence of the PE sleeve in the pipeline for each of the thresholds used at the time of determining the presence or absence of the water leak and the water leak amount. Therefore, the water leak sensing system 10 according to the second embodiment can ensure or improve the water leak sensing accuracy.

[First Function—Sensor Arrangement]

The water leak sensing system 10 according to the first embodiment has a function (referred to as a first function) of determining a suitable sensor arrangement in the water supply network 40. The computer 1 determines the suitable sensor arrangement of the plurality of sensors 3 in the target water supply network 40 by calculation using the pipeline information d2 including the PE sleeve presence/absence information, and proposes the determined sensor arrangement to the user. The suitable sensor arrangement is the arrangement of the plurality of sensors 3 with respect to positions of the water control valve 5 of the water supply network 40 with suitable interval and density using the water leak sensing-possible distance and range of the sensor 3 as references. The water leak sensing-possible distance is a distance between an assumed water leak point and the sensor 3, is a distance with which sufficient detection accuracy can be secured, and is a distance serving as the reference of the arrangement. The suitable interval is a distance between two adjacent sensors 3 via a partial pipeline. In the first function, the suitable sensor arrangement is determined by the distance and range of the sensor 3 so as to cover the water leak sensing in the target area while securing sufficient detection accuracy.

Detection characteristics including the water leak sensing-possible distance of the sensor 3 to be used are set according to the environment of the presence or absence of the PE sleeve in the pipeline or the area, that is, in consideration of the characteristics such as the above-described release to air and release to water. In the pipeline with the PE sleeve, the water leak sensing-possible distance of the sensor 3 can be set to a distance twice to 10 times (for example, several times) as long as that in the pipeline without the PE sleeve. In a policy that prioritizes reduction of the number of sensors, the water leak sensing-possible distance of the sensor 3 is set as a distance as long as possible. As a result, the number of sensors 3 to be installed in the target water supply network 40 can be reduced, and thus, the water leak sensing can be realized at low cost. In a policy that prioritizes detection accuracy or the like rather than the reduction of the number of sensors, it is also possible to set the water leak sensing-possible distance of the sensor 3 as a shorter distance.

The water leak sensing system of the prior art example does not utilize the PE sleeve presence/absence information regarding designing the arrangement (for example, a sensor installation position, an inter-sensor distance, and the like) of the plurality of sensors of the water supply network. In the water leak sensing system of the prior art example, the water leak sensing-possible distance of the sensor or the inter-sensor distance is set as fixed values on the premise that the entire pipeline has no PE sleeve or has the PE sleeve regardless of the presence or absence of the PE sleeve of the water pipe. On the other hand, according to the first function of the water leak sensing system 10 of the first embodiment, the PE sleeve presence/absence information is used to determine the suitable sensor arrangement (that is, the sensor installation position, the inter-sensor distance, and the like) assuming the different water leak sensing-possible distances of the sensors 3 depending on the presence or absence of the PE sleeve in the pipeline. Accordingly, a more suitable sensor arrangement can be proposed in consideration of the presence or absence of the PE sleeve in the water leak sensing system 10 according to the first embodiment as compared to the prior art example even if the pipeline information serving as the source is the same. As a result, the water leak sensing can be realized at low cost with a small number of sensors.

Figure 14:
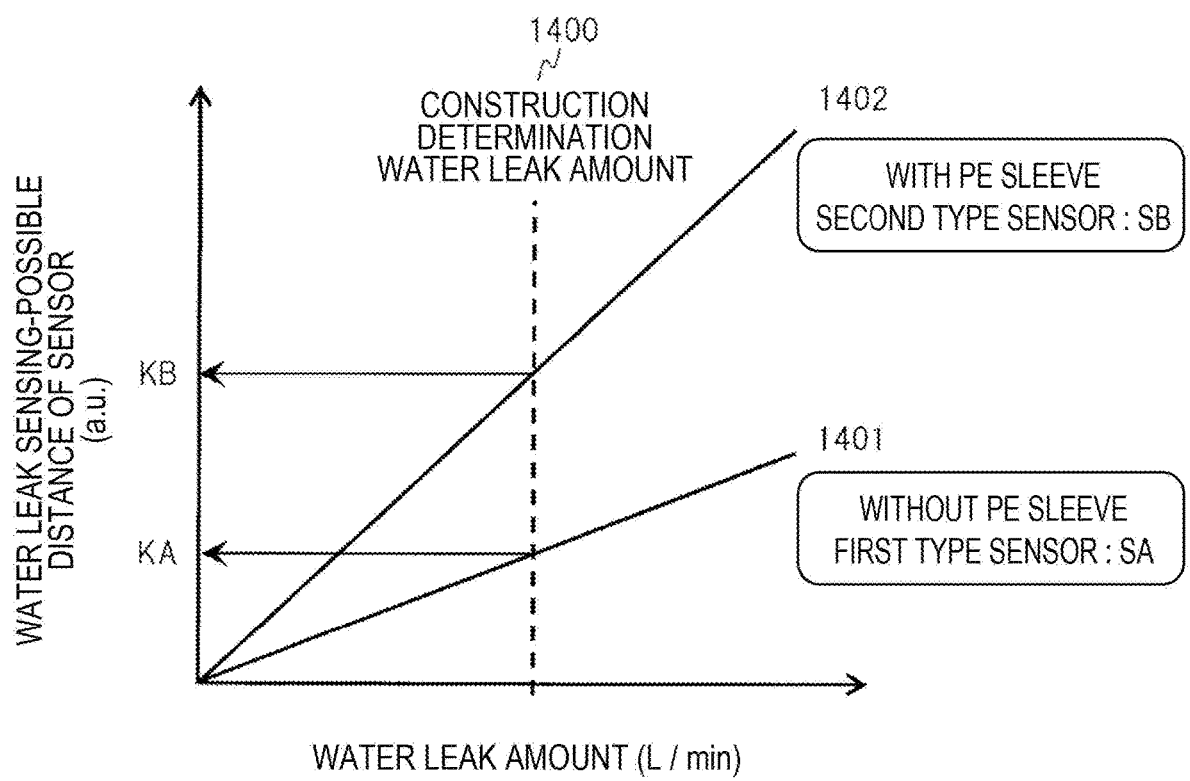
FIG. 14 is a graph illustrating a relationship between a water leak amount and a water leak sensing-possible distance of a sensor depending on presence or absence of the PE sleeve in the water leak sensing system of the first embodiment.

FIG. 14 illustrates an explanatory graph relating to the sensor arrangement in the first function. The graph of FIG. 14 represents a relationship between the water leak amount and the water leak sensing-possible distance of the sensor 3 depending on the presence or absence of the PE sleeve. The horizontal axis represents the water leak amount [L/min], and the vertical axis represents the water leak sensing-possible distance according to the water leak amount. A water leak amount 1400 corresponds to a certain construction determination water leak amount.

A straight line 1401 indicates a characteristic of the water leak sensing-possible distance according to the water leak amount of a sensor corresponding to the environment without the PE sleeve (referred to as a first type sensor SA). The straight line 1401 corresponds to a sensor that does not depend on the presence or absence of the PE sleeve in the water leak sensing system of the prior art example, or the sensor 3 installed in the pipeline without the PE sleeve in the water leak sensing system 10 of the first embodiment. A straight line 1402 indicates a characteristic of the water leak sensing-possible distance according to the water leak amount of a sensor (referred to as a second type sensor SB) corresponding to the environment with the PE sleeve. The straight line 1402 corresponds to the sensor 3 installed in the pipeline with the PE sleeve in the water leak sensing system 10 according to the first embodiment. Even if the first type sensor SA and the second type sensor SB are the same sensor 3 in terms of a material and performance, different water leak sensing-possible distances are set thereto.

In the water leak sensing system 10 of the first embodiment, the water leak sensing-possible distance of the sensor 3 includes at least two types of water leak sensing-possible distances in accordance with the presence and absence of the PE sleeve. For example, with the same water leak amount 1400, the water leak sensing-possible distance in the case of the straight line 1401 of the first type sensor SA is a distance KA, and the water leak sensing-possible distance in the case of the straight line 1402 of the second type sensor SB is a distance KB. The distance KB is longer than the distance KA (KB>KA).

The computer 1 sets the water leak sensing-possible distance of the sensor 3 (SA or SB) according to the environment of the presence or absence of the PE sleeve based on the pipeline information d2 by the first function, and calculates the sensor arrangement using the inter-sensor distance according to the water leak sensing-possible distance or the like as the reference.

Figure 15A:
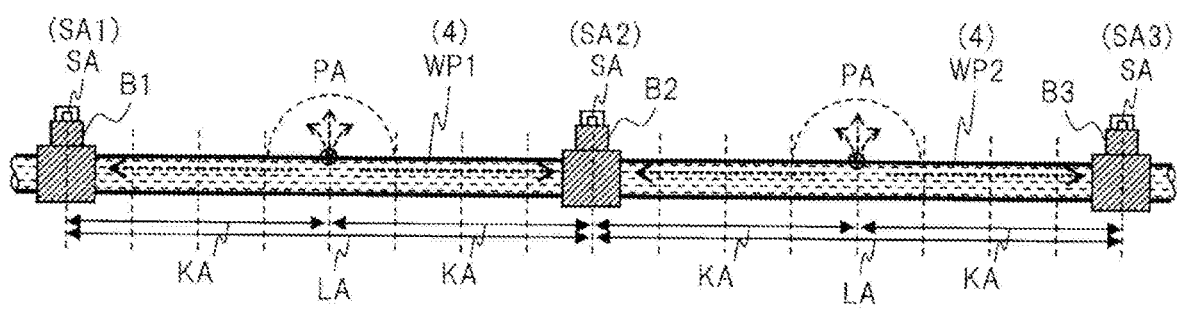
FIG. 15A is a view illustrating a sensor arrangement example in the case of absence of the PE sleeve in the water leak sensing system of the first embodiment.
Figure 15B:
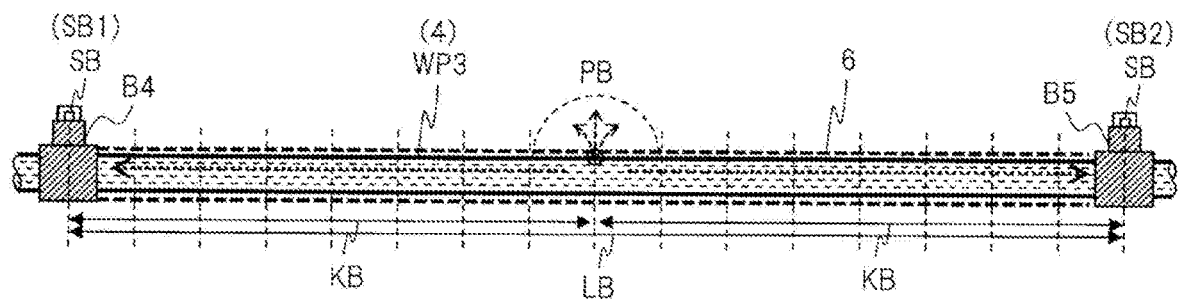
FIG. 15B is a view illustrating a sensor arrangement example in the case of presence of the PE sleeve in the water leak sensing system of the first embodiment.

FIG. 15A and FIG. 15B illustrate an overview of the sensor arrangement according to the presence or absence of the PE sleeve in the water pipe 4, which corresponds to FIG. 14. FIG. 15A illustrates an example in which the first type sensor SA is arranged on the water control valve 5 of the pipeline without the PE sleeve based on the distance KA. In this example, the water pipes WP1 and WP2 are provided as partial pipelines in the water pipe 4, and water control valves B1, B2, and B3 are provided as the water control valves 5. A water leak point PA is an example of the water leak point when assuming a predetermined water leak amount (for example, the water leak amount 1400). An environment near the water leak point PA is soil without the PE sleeve. When covering the water leak sensing of the water pipes WP1 and WP2, the sensor 3 (SA) is arranged at a position of the distance KA on the right and left side in the X direction with respect to the water leak point PA, respectively. In other words, a pair of the two sensors 3 (SA) is arranged with a distance twice the distance KA as an inter-sensor distance LA (LA=KA×2). The position of the sensor 3 (SA) is determined such that the target pipeline is included within a range having the distance KA of the sensor 3 (SA) as a radius. In addition, a position of the water control valve 5 satisfying such conditions is selected, and the sensor 3 (SA) is arranged at such a position of the water control valve 5. In the example of FIG. 15A, sensors SA1, SA2, and SA3 are arranged in the water control valves B1, B2, and B3. For example, when a water leak occurs at any position on the water pipe WP1, the water leak can be sensed by at least one of the sensors SA1 and SA2. In an actual pipeline network, various distances are set between the water control valves 5, and thus, the water control valve 5 to which the sensor 3 (SA) is arranged is selected based on the inter-sensor distance LA.

Similarly, FIG. 15B illustrates an example in which the second type sensor SB is arranged based on the distance KB in the water control valve 5 of the pipeline with the PE sleeve. In this example, the water pipe WP3 is provided as a partial pipeline in the water pipe 4, and water control valves B4 and B5 are provided as the water control valves 5. A water leak point PB is an example of the water leak point when assuming a predetermined water leak amount (for example, the water leak amount 1400). The PE sleeve 6 is present in an environment near the water leak point PB. When covering the water leak sensing of the water pipe WP3, the sensor 3 (SB) is arranged at a position of the distance KB on the right and left side in the X direction with respect to the water leak point PB, respectively. In other words, a pair of the two sensors 3 (SB) is arranged with a distance twice the distance KB as an inter-sensor distance LB (LB=KB×2). In this example, the distance KB is about twice the distance KA, and the inter-sensor distance LB is about twice the inter-sensor distance LA. The position of the sensor 3 (SB) is determined such that the target pipeline is included within a range having the distance KB of the sensor 3 (SB) as a radius. In addition, a position of the water control valve 5 satisfying such conditions is selected, and the sensor 3 (SB) is arranged at such a position of the water control valve 5. In the example of FIG. 15B, sensors SB1 and SB2 are arranged in the water control valves B4 and B5. For example, when a water leak occurs at any position on the water pipe WP3, the water leak can be sensed by at least one of the sensors SB1 and SB2. As described above, the sensors can be arranged at different distance intervals and different densities depending on the presence or absence of the PE sleeve in the first function according to the first embodiment.

[First Function—Sensor Characteristic]

A table of FIG. 16 illustrates an implementation example of a characteristic of the sensor 3 according to the pipeline with or without the PE sleeve based on an experiment by the present inventor. This table shows specific numerical examples of the vibration intensity and the water leak sensing-possible distance relating to the sensor 3 depending on the presence or absence of the PE sleeve when conditions and characteristics of pipelines of the target water pipe 4 are aligned as fixed values for the comparison. A pipe type and diameter, a water leak amount, and a water pressure are fixed as the pipeline conditions. The pipe type is a ductile cast iron pipe of "DK75", a joint o a K joint, and a nominal diameter is 75 mm. The water leak amount is 7 L/min, and the water pressure is 0.4 MPa. The water leak sensing-possible distance varies depending on the conditions, but as a basic definition, is a distance until a vibration intensity is attenuated to a vibration intensity twice as high as a vibration intensity in the case where the water leak is absent when compared with the pipeline of the same environment.

In the pipeline without the PE sleeve, the vibration intensity near the water leak point detected by the sensor 3 (SA) is 200 µG/√Hz. Accordingly, the water leak sensing-possible distance (distance KA) of the sensor 3 (SA) is about 70 m. In the pipeline with the PE sleeve, the vibration intensity near the water leak point detected by the sensor 3 (SB) is 8 μG/√Hz. Accordingly, the water leak sensing-possible distance (distance KB) of the sensor 3 (SB) is about 140 m.

In detail, the characteristic of the water leak also differs depending on a type of soil (for example, clay or sand) around the water pipe 4 and the like. Therefore, the pipeline information d2 including the PE sleeve presence/absence information may include more detailed information such as soil. The computer 1 may calculate the sensor arrangement or perform the water leak determination using such information of soil or the like. As a result, the sensor arrangement can be made more suitable so that the detection accuracy can be further improved.

[First Function—Sensor Arrangement Calculation Function]

A water leak sensing system is required to be capable of sensing a water leak with sufficient accuracy and to realize such water leak sensing at the cost as low as possible. For this purpose, the design of positions and the number of sensors installed in the pipeline network, a spacing distance, and a density is important. For example, when a local government introduces the water leak sensing system, it is necessary to design the arrangement of a plurality of sensors on a pipeline of a water supply network. That is, it is necessary to determine which positions on the pipeline the plurality of sensors need to be arranged at with which distance interval and density. The accuracy and cost involved in the water leak sensing differ depending on the sensor arrangement. The water leak sensing system of the prior art example does not sufficiently examine a suitable sensor arrangement, and does not have a function to calculate the suitable sensor arrangement. Basically, it is also possible to install sensors to all the water control valves of the water supply network, but the cost becomes relatively high in such a case. In addition, the labor and time are required to manually design the suitable sensor arrangement.

Therefore, the water leak sensing system 10 of the first embodiment has a sensor arrangement calculation function of automatically calculating the suitable sensor arrangement as a part of the first function. In this sensor arrangement calculation function, the suitable sensor arrangement is calculated based on the pipeline information d2 in accordance with the user's policy (for example, a policy of prioritizing low cost). As a result, it is possible to propose the sensor arrangement with as few sensors as possible while securing sufficient accuracy to cover the target area. The user can easily determine the suitable sensor arrangement. The user's labor and time caused by manual design can also be reduced.

As described above, target positions to which the plurality of sensors 3 are to be installed are basically set to positions of the water control valve 5 in the water leak sensing system 10 according to the first embodiment. That is, the sensor arrangement calculation function of the water leak sensing system 10 according to the first embodiment calculates the arrangement of the plurality of sensors 3 (corresponding sensor terminals 2) suitable for the plurality of water control valves 5 in the water supply network 40.

When calculating the sensor arrangement, the computer 1 sets the water leak sensing-possible distance of the sensor 3 in consideration of the characteristic and environment depending on the presence or absence of the PE sleeve described above, and sets the inter-sensor distance (for example, the inter-sensor distance LB in FIG. 15B) according to such a water leak sensing-possible distance. Then, the computer 1 arranges the plurality of sensors 3 with respect to the plurality of water control valves 5 using the inter-sensor distance or the like as the reference. In detail, the water leak sensing-possible distance of the sensor 3 is set according to the characteristic of the sensor 3 itself, the condition of the pipeline, the surrounding environment (the soil and the PE sleeve), the water leak amount, and the like.

[First Function—Sensor Arrangement Example]

Figure 17A:
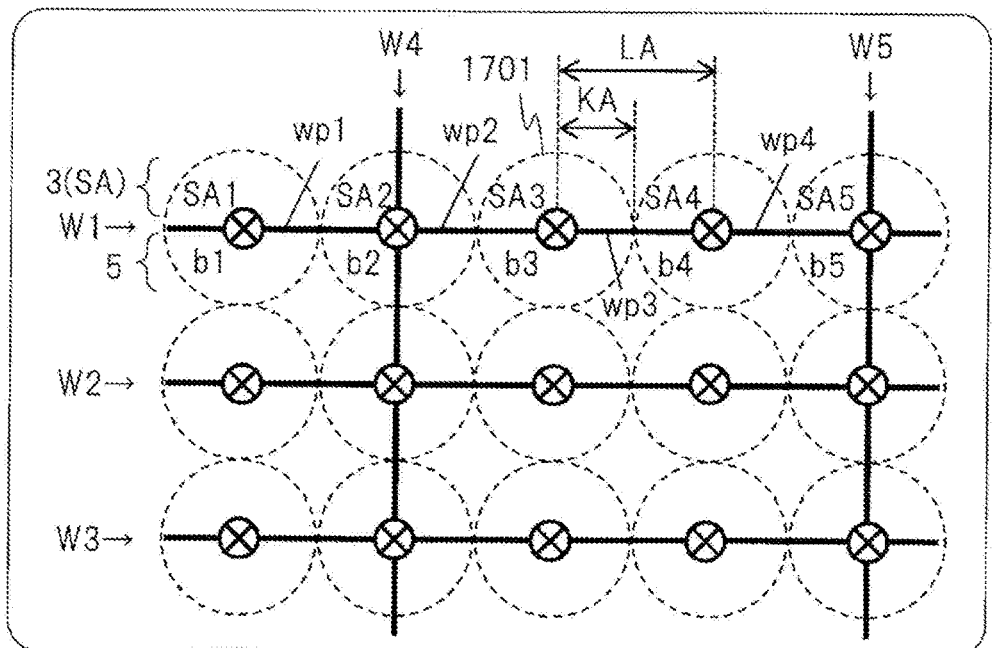
FIG. 17A is a view illustrating a sensor arrangement example when PE sleeve presence/absence information is not utilized in a water leak sensing system of a prior art example.
Figure 17B:
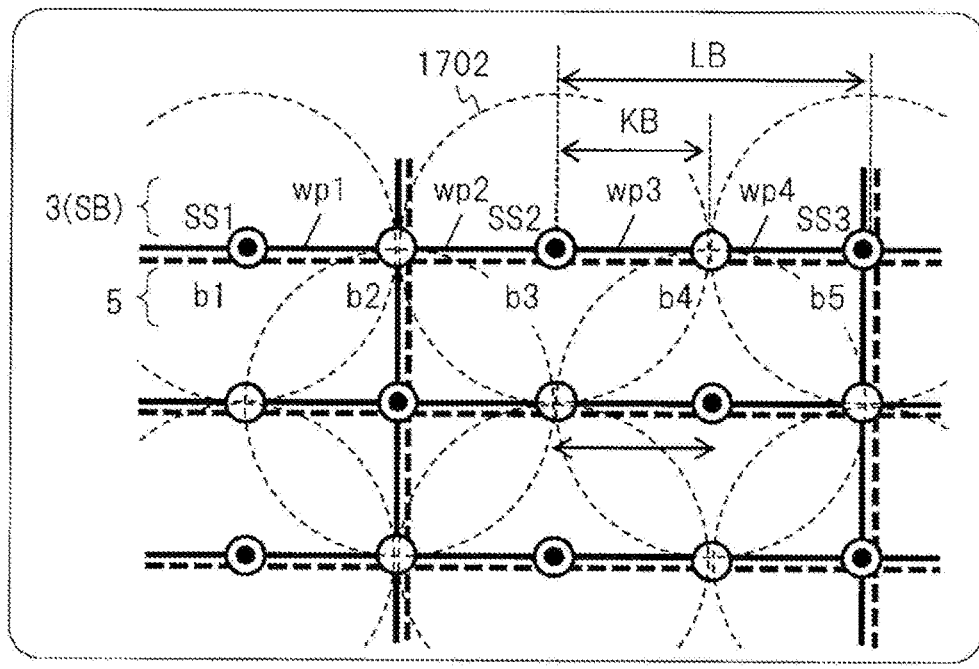
FIG. 17B is a view illustrating a sensor arrangement example when the PE sleeve presence/absence information is utilized in the water leak sensing system of the first embodiment.

FIGS. 17A and 17B illustrate overviews of sensor arrangement examples according to PE sleeve presence/absence information in comparison. FIG. 17A illustrates the sensor arrangement example determined without utilizing the PE sleeve presence/absence information in the water leak sensing system of the prior art example. Here, for comparison, it is assumed that the same sensor 3 as the first embodiment is used as a sensor. FIG. 17A illustrates a pipeline without a PE sleeve as an example of a partial pipeline. For example, the water pipe W1 has water pipes wp1, wp2, wp3, wp4, and the like as partial pipelines, and has water control valves b1, b2, b3, b4, b5, and the like as the water control valves 5. A place with a symbol in which an x mark is attached to a round indicates the water control valve 5 in which the sensor 3 (first type sensor SA) is arranged. For example, the sensor SA1 is installed in the water control valve b1, and the sensor SA2 is installed in the water control valve b2. In this sensor 3 (SA), a water leak sensing-possible distance is the distance KA. A range 1701 indicates a water leak sensing-possible range having the distance KA as a radius. The inter-sensor distance LA is also illustrated. In an area of a pipeline network in FIG. 17A, the sensors 3 (SA) are arranged in all the water control valves 5, and the number of sensors is fifteen.

FIG. 17B illustrates the sensor arrangement example determined by utilizing the PE sleeve presence/absence information in the water leak sensing system 10 according to the first embodiment. The pipeline and the like in FIG. 17B have the same configurations as the pipeline and the like in FIG. 17A. The PE sleeve 6 is indicated by the broken line. A place with a white circle indicates the water control valve 5 in which the sensor 3 (the second type sensor SB) is not arranged. A place in which a black circle is attached to a white circle indicates the water control valve 5 in which the sensor 3 (the second type sensor SB) is arranged. For example, the sensor SB1 is installed in the water control valve b1, and the sensor SB2 is installed in the water control valve b3. As described above, the water leak sensing-possible distance is the distance KB in the sensor 3 (SB). A range 1702 indicates a water leak sensing-possible range having the distance KB as a radius. The inter-sensor distance LB is also illustrated. In an area of a pipeline network in FIG. 17B, the sensors 3 (SB) are arranged in some of the water control valves 5, and the number of sensors is eighteen. As compared to the case of FIG. 17A, the number of sensors is reduced to about half and the density is reduced to about half in the case of FIG. 17B.

As described above, it is possible to determine the suitable sensor arrangement in consideration of the presence or absence of the PE sleeve by the first function in the water leak sensing system 10 according to the first embodiment. It is possible to realize the sensor arrangement with the smallest possible number of sensors with the longest possible inter-sensor distance in order to cover the target area, and to reduce unnecessary installation of the sensor 3 to the water control valve 5.

[First Function—Sensor Arrangement Screen]

Figure 18:
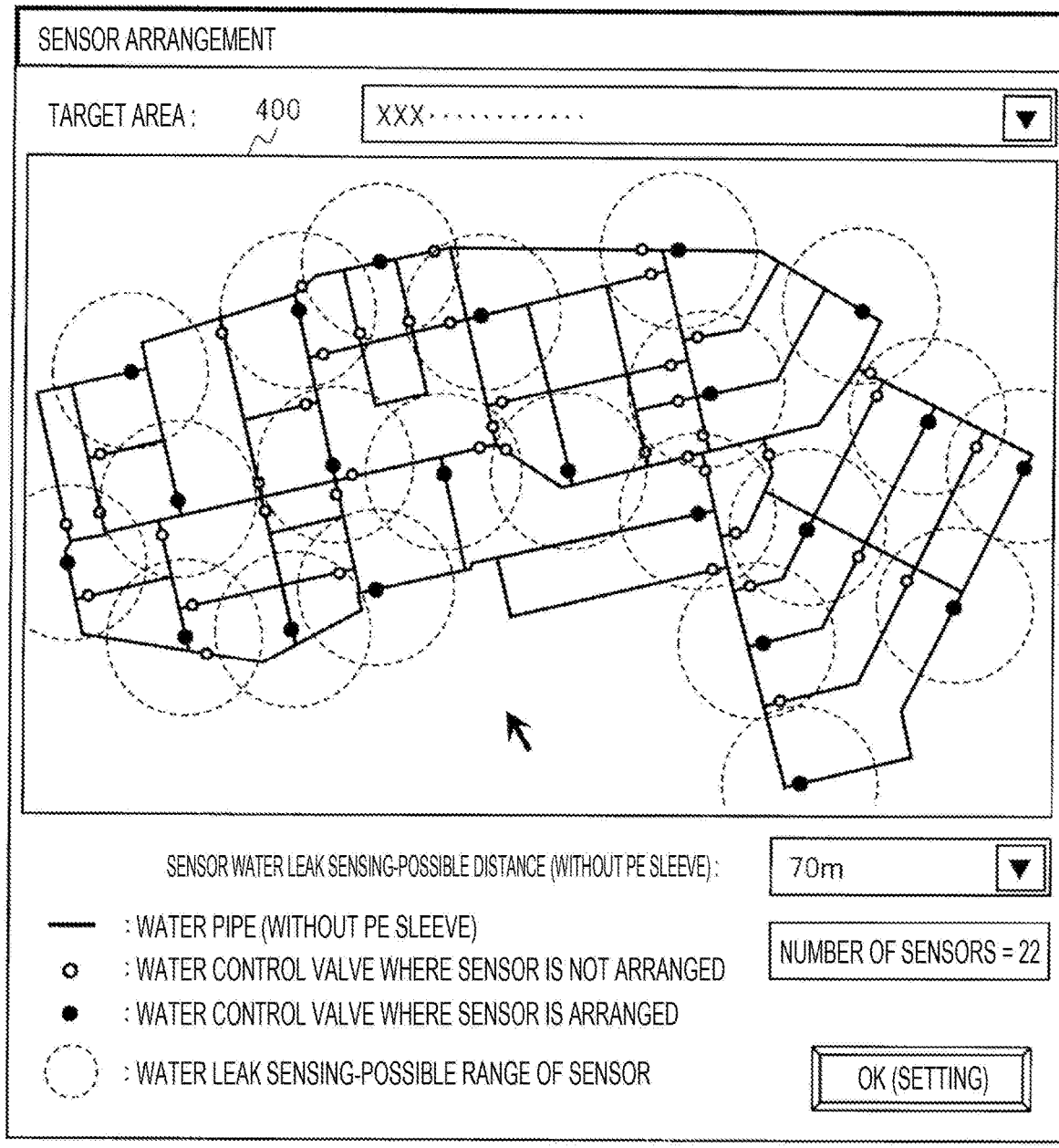
FIG. 18 is a view illustrating a sensor arrangement example in the case of absence of the PE sleeve, as a screen example, in the water leak sensing system according to the first embodiment.
Figure 19:
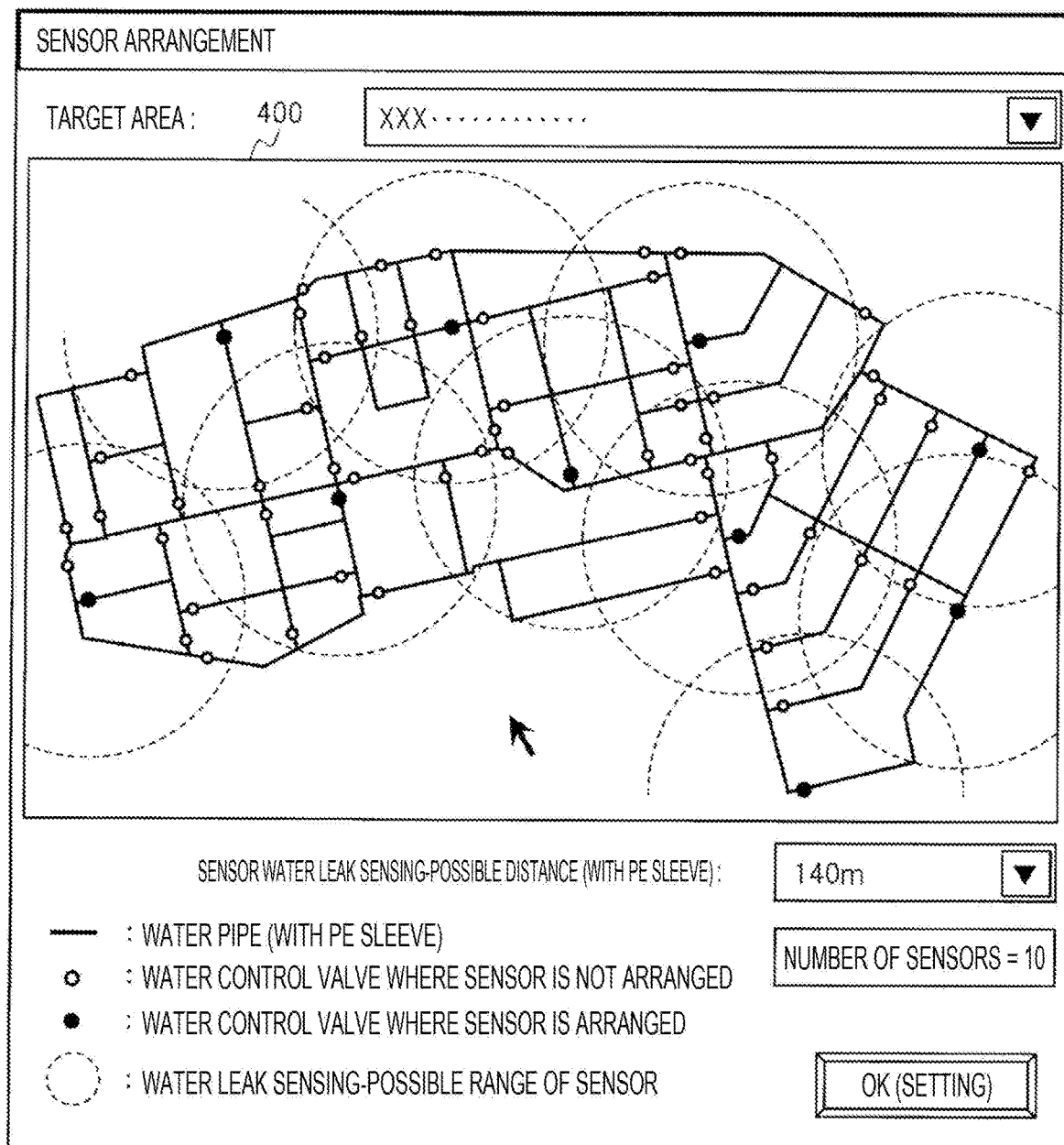
FIG. 19 is a view illustrating a sensor arrangement example in the case of presence of the PE sleeve, as a screen example, in the water leak sensing system according to the first embodiment.

FIGS. 18 and 19 illustrate screen examples relating to the sensor arrangement. These screen examples are examples in which display of sensor arrangement information is added on the basis of the screen of FIG. 4. FIG. 18 illustrates a pipeline example and a sensor arrangement example which are more detail than those in the case of the pipeline without the PE sleeve as illustrated in FIG. 17A. FIG. 19 illustrates a pipeline example and a sensor arrangement example which are more detail than those in the case of the pipeline with the PE sleeve as illustrated in FIG. 17B.

On the screen of FIG. 18, sensor arrangement information is displayed to be superimposed on a pipeline network in the map field 400. A target pipeline network is the pipeline without the PE sleeve. A white circle indicates the water control valve 5 in which the sensor 3 (SA) is not arranged, and a black circle indicates the water control valve 5 in which the sensor 3 (SA) is arranged. In addition, a circle of a broken line indicates a water leak sensing-possible range corresponding to the water leak sensing-possible distance (distance KA) of the sensor 3 (SA). Incidentally, the water leak sensing-possible range may be displayed or is not necessarily displayed on the screen. In this example, information on the number of sensors in the target area is also displayed on the screen. For example, the number of sensors is 22 in the pipeline network in FIG. 18.

Similarly, the sensor arrangement information is displayed in the map field 400 on the screen of FIG. 19. A target pipeline network is the pipeline with the PE sleeve. A circle of a broken line indicates a water leak sensing-possible range corresponding to the water leak sensing-possible distance (distance KB) of the sensor 3 (SB). In this example, the number of sensors is ten in the pipeline network in FIG. 19.

The user can confirm the sensor arrangement calculated by the sensor arrangement calculation function of the first function on such a screen. When partially correcting the sensor arrangement, the user can select and operate the desired water control valve 5 in the map field 400 to switch the presence and absence of the sensor 3. When desiring to confirm detailed information of the partial pipeline, the water control valve 5, the sensor 3, or the like, the user can view and confirm the displayed detailed information by selecting and operating the corresponding place. When saving the state of the sensor arrangement in the map field 400, the user can save the state by pressing an OK (setting) button. With such a screen, the user can confirm and edit the sensor arrangement calculated by the sensor arrangement calculation function of the first function, and can make a final determination and set the sensor arrangement.

[Effect (1)]

As described above, it is possible to reduce the sensor arrangement cost and the like according to the water leak sensing system 10 of the first embodiment.

Second Embodiment

A water leak sensing system according to the second embodiment of the invention will be described with reference to FIGS. 20 to 23C. A basic configuration of the water leak sensing system of the second embodiment is the same as that of the first embodiment. Hereinafter, components, different from those of the first embodiment, of the second embodiment will be described. The water leak sensing system 10 according to the second embodiment performs different determinations depending on presence or absence of a PE sleeve when a water leak is determined by the computer 1. In the water leak sensing system 10 according to the second embodiment, it is unnecessary to change the arrangement of the plurality of sensors 3 in the water supply network 40 in accordance with the presence or absence of the PE sleeve as in the first embodiment, and the sensors are arranged at an interval using a predetermined distance as a reference, for example.

In the second embodiment, when a water leak amount determination is performed, the determination is performed, for example, in the following processing order similarly to the above description. (1) The computer 1 specifies a distance from a water leak point to the sensor 3 based on a water leak position determination. (2) The computer 1 calculates an attenuation rate caused by the distance. (3) The computer 1 performs a determination according to the attenuation rate and according to the presence or absence of the PE sleeve. In a first determination scheme, the computer 1 performs the determination using an attenuation rate and a threshold according to the presence or absence of the PE sleeve. In a second determination scheme, the computer 1 corrects a detection signal value according to the attenuation rate and the presence or absence of the PE sleeve. Since the determination on the water leak position is calculated by a time difference until a water leak signal reaches each of the sensors 3 as will be described later, it is possible to calculate the water leak position without considering the presence or absence of the PE sleeve of the pipeline if parameters (a pipe type, a diameter, sound speed in water, and the like) of the pipeline are known.

[Second Function—Water Leak Sensing Determination Scheme]

The water leak sensing system 10 according to the second embodiment has the following function (referred to as a second function) relating to the water leak determination. The second function of the computer 1 uses the following first determination scheme or second determination scheme regarding the water leak determination scheme. The water leak sensing system 10 of the second embodiment applies the first determination scheme. A water leak sensing system of a modification of the second embodiment applies the second determination scheme. Incidentally, a mode in which either the first determination scheme or the second determination scheme can be selected and applied in accordance with the setting may be adopted. According to the second function, it is possible to ensure or improve the water leak sensing accuracy in accordance with the environment of the presence or absence of the PE sleeve.

[Second Function—First Determination Scheme]

The first determination scheme is a scheme in which presence or absence of a water leak, a water leak amount, a water leak position, and the like are determined using conditions including different thresholds in accordance with the environment of the presence or absence of the PE sleeve of the pipeline. For example, both of a threshold (first threshold) corresponding to the environment without the PE sleeve and a threshold (second threshold) corresponding to the environment with the PE sleeve are set in advance as the thresholds for each of the water leak presence/absence determination and the water leak amount determination. Each of the first threshold and the second threshold may be further constituted by a plurality of thresholds. When performing a determination on detection signal data of the sensor 3, the computer 1 confirms the presence or absence of the PE sleeve of the pipeline associated with the sensor 3. When the sensor 3 is associated with the pipeline without the PE sleeve, the computer 1 determines the presence or absence of the water leak and the like using the condition including the first threshold in the case of absence of the PE sleeve. When the sensor 3 is associated with the pipeline with the PE sleeve, the computer 1 determines the presence or absence of the water leak and the like using the condition including the second threshold in the case of presence of the PE sleeve.

[Second Function—Example of First Determination Scheme]

Figure 20A:
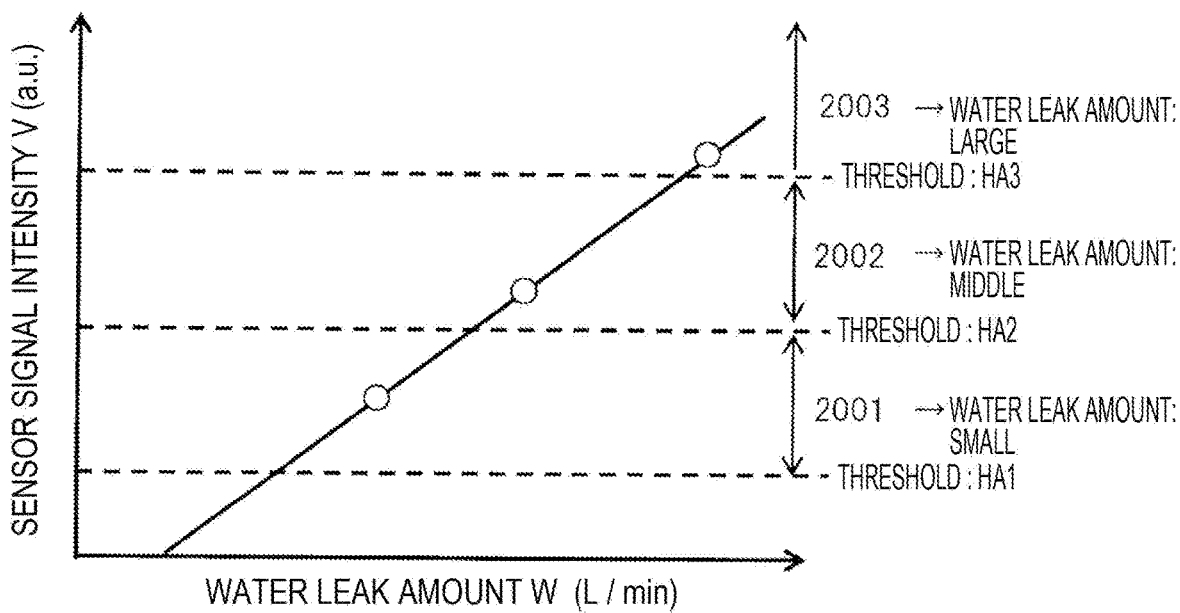
FIG. 20A is a graph illustrating a condition in the case of absence of a PE sleeve in a first determination scheme according to a water leak presence/absence determination in a water leak sensing system according to a second embodiment of the invention.
Figure 20B:
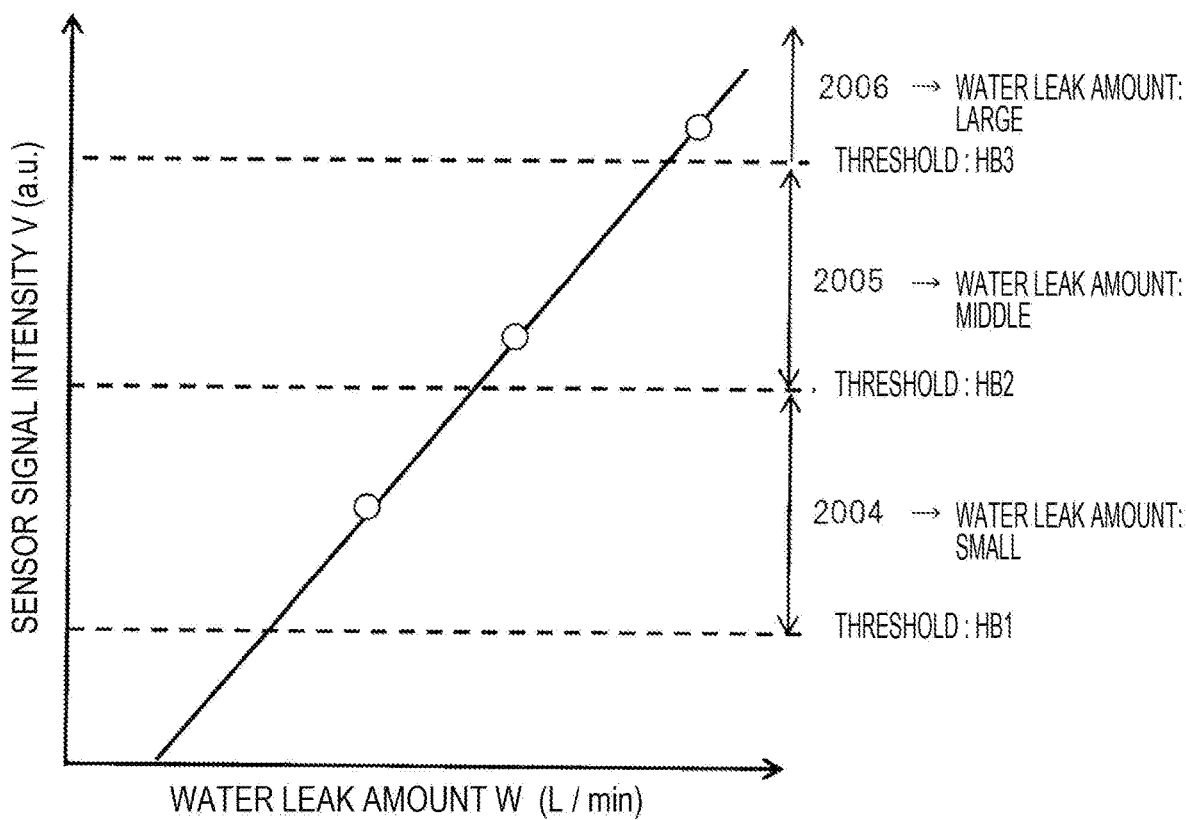
FIG. 20B is a graph illustrating a condition in the case of presence of the PE sleeve in the first determination scheme according to the water leak presence/absence determination in the water leak sensing system according to the second embodiment of the invention.

FIGS. 20A and 20B illustrate examples of the first determination scheme, and illustrate graphs of conditions including the setting of thresholds for the determination on the presence or absence of the water leak and the water leak amount. FIG. 20A illustrates the graph of the condition to be applied in the case of the pipeline without the PE sleeve. FIG. 20B illustrates the graph of the condition to be applied in the case of the pipeline with the PE sleeve. The horizontal axis of the graph represents a water leak amount [L/min] (value is W), and the vertical axis represents a vibration intensity of a detection signal of the sensor 3 according to the water leak amount [arbitrary unit] (value is V).

In the example of FIG. 20A, three thresholds HA1, HA2, and HA3 are set as the first threshold according to the condition (HA1<HA2<HA3). These thresholds are thresholds of the case of determining the magnitude of the water leak amount when the water leak is present roughly at three levels of large, middle, and small. These thresholds are set to values associated with the water leak sensing-possible distance (distance KA) of the sensor 3 (SA) in the case of the pipeline without the PE sleeve. For example, when the signal value V is within a range 2001 equal to or larger than the threshold HA1 and smaller than the threshold HA2, it is determined that the water leak is present and the water leak amount level is small. When the signal value V is within a range 2003 equal to or larger than the threshold HA2 and smaller than the threshold HA3, it is determined that the water leak is present and the water leak amount level is middle. When the signal value V is within a range 2003 equal to or larger than the threshold HA3, it is determined that the water leak is present and the water leak amount level is large.

In the example of FIG. 20B, three thresholds HB1, HB2, and HB3 are set as the second threshold according to the condition (HB1<HB2<HB3). These thresholds are thresholds used in the case of similarly performing the determination at three levels. These thresholds are set to values associated with the water leak sensing-possible distance (distance KB) of the sensor 3 (SB) in the case of the pipeline with the PE sleeve. For example, when the signal value V is within a range 2004 equal to or larger than the threshold HB1 and smaller than the threshold HB2, it is determined that the water leak is present and the water leak amount level is small. When the signal value V is within a range 2005 equal to or larger than the threshold HB2 and smaller than the threshold HB3, it is determined that the water leak is present and the water leak amount level is middle. When the signal value V is within a range 2006 equal to or larger than the threshold HB3, it is determined that the water leak is present and the water leak amount level is large.

As compared to the condition of FIG. 20A, an inclination of the straight line representing the characteristic is set to be larger under the condition of FIG. 20B. For example, HA1<HB1 between the threshold HA1 and the threshold HB1. Since the characteristic relating to the vibration detection differs between the sensor SA (distance KA) and the sensor SB (distance KB) depending on the presence or absence of the PE sleeve, the different thresholds are set in this manner. As a result, it is possible to enhance the sensing accuracy of the presence or absence of water leak and the water leak amount. As compared to the pipeline without the PE sleeve, the water leak signal is attenuated little and propagates farther in the case of the pipeline with the PE sleeve due to the difference between the characteristic of the release to water and the characteristic of the release to air in the environment near the water leak point as described above. Thus, the vibration intensity of the detection signal in the sensor 3 (SB) becomes higher.

In this manner, it is possible to enhance the water leak sensing accuracy based on the predetermined sensor arrangement according to the first determination scheme. Although the threshold setting example regarding the water leak amount determination scheme corresponding to FIG. 13 is illustrated in this example, the first determination scheme of setting different thresholds in accordance with the presence or absence of the PE sleeve can also be similarly applied regarding the water leak presence/absence determination scheme corresponding to FIG. 12.

[Second Function—Second Determination Scheme]

The second determination scheme is a scheme in which a value of a detection signal of the sensor 3 is corrected in accordance with the presence or absence of the PE sleeve of the pipeline, and uses a predetermined threshold as the threshold. The second determination scheme assumes an environment in which the presence and absence of the PE sleeve are mixed, and the plurality of sensors 3 are arranged in the water supply network 40 using predetermined water leak sensing-possible distance and inter-sensor distance as references. In the second determination scheme, the computer 1 determines presence or absence of a water leak, a water leak amount, a water leak position, and the like using a condition including a threshold corresponding to either the presence or absence of the PE sleeve (for example, the absence of the PE sleeve). Then, in the second determination scheme, the computer 1 performs a predetermined correction operation with respect to a detection signal of the sensor 3 from another environment (for example, the presence of the PE sleeve) different from one environment (for example, the absence of the PE sleeve) set as the basis such that a difference in environment is corrected to match the one environment (for example, the absence of the PE sleeve). The computer 1 determines the presence or absence of the water leak, the water leak amount, the water leak position, and the like using the condition including the threshold corresponding to the one environment (for example, the absence of the PE sleeve).

In the specific example, the one environment set as the basis is the environment without the PE sleeve. A water leak sensing-possible distance of the sensor 3 is set, for example, as a distance corresponding to the environment without the PE sleeve (the above-described distance KA). In addition, the threshold corresponding to the environment without the PE sleeve is set as the predetermined threshold during the determination. When performing a determination on detection signal data of the sensor 3, the computer 1 confirms the presence or absence of the PE sleeve of the pipeline associated with the sensor 3. When the sensor 3 is associated with the pipeline without the PE sleeve, the computer 1 does not perform the correction operation on the value of the signal but directly uses the condition including the predetermined threshold to determine the presence or absence of the water leak and the like. When the sensor 3 is associated with the pipeline with the PE sleeve, the computer 1 performs the correction operation by multiplying a value of the signal by a predetermined coefficient or the like, and determines the presence or absence of the water leak and the like using the condition including the same predetermined threshold for the corrected value of the signal.

[Second Function—Example of Second Determination Scheme]

Figure 21:
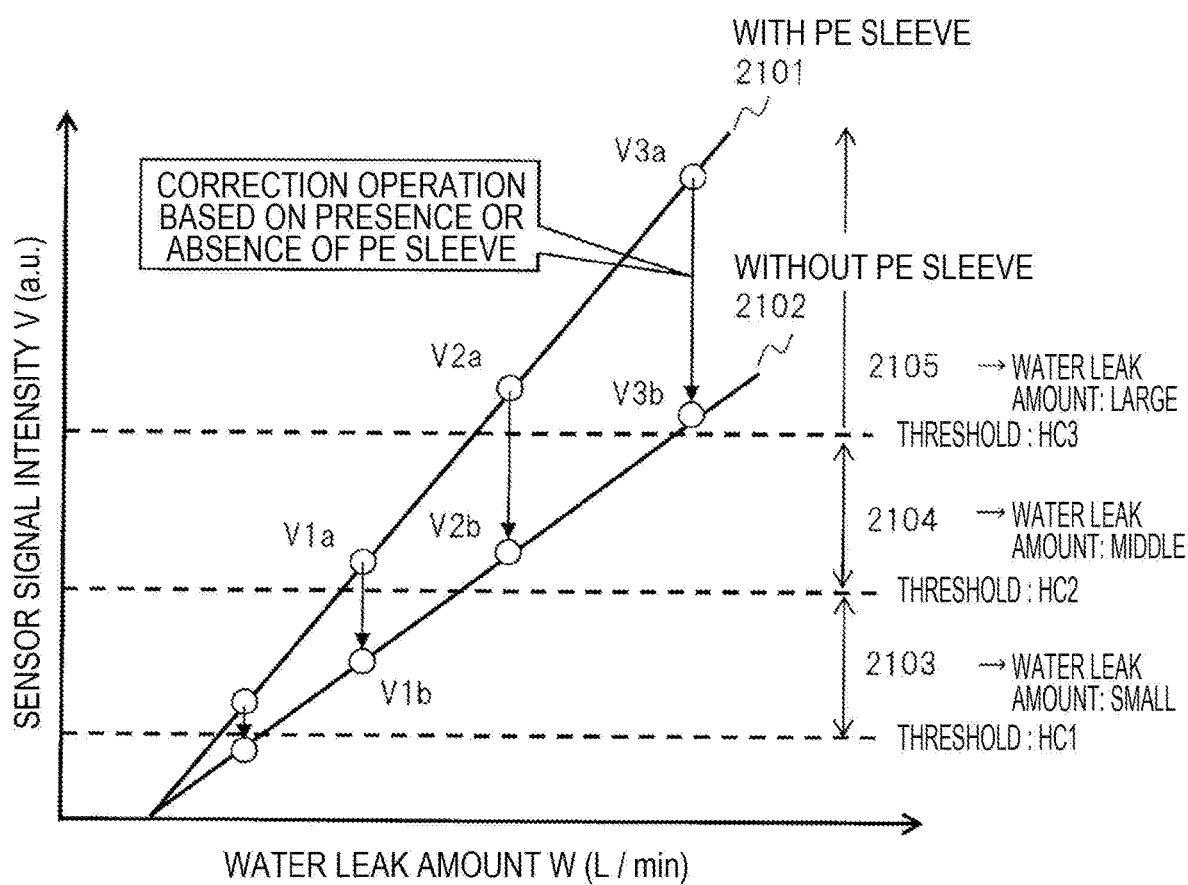
FIG. 21 is a graph illustrating a first example of a second determination scheme according to the water leak presence/absence determination in the water leak sensing system of the second embodiment.

FIG. 21 illustrates an example of the second determination scheme, and illustrate a graph of a condition including the setting of thresholds for the determination on the presence or absence of the water leak and the water leak amount. The horizontal axis of the graph represents a water leak amount [L/min] (value W), and the vertical axis represents a vibration intensity of a detection signal of the sensor 3 according to the water leak amount [arbitrary unit] (value V). A straight line 2101 indicates a detection signal value according to the water leak amount regarding the sensor 3 (SB) associated with the pipeline with the PE sleeve. A straight line 2102 indicates a detection signal value according to the water leak amount regarding the sensor 3 (SA) associated with the pipeline without the PE sleeve, or a signal value obtained after a correction operation using a signal value in the presence of the PE sleeve.

In the example of the second determination scheme, the sensors 3 are arranged using a predetermined inter-sensor distance or the like as a reference while assuming the mixed state of the presence and absence of the PE sleeve, as the sensor arrangement of the water supply network 40. As the setting of the computer 1, a condition including a predetermined threshold on the basis of the pipeline and the environment without the PE sleeve is set. Then, in the example of the second determination scheme, when a signal of the target sensor 3 is the signal (straight line 2101) of the sensor 3 corresponding to the pipeline with the PE sleeve, the computer 1 performs the correction operation to correct the sensitivity from the presence of the PE sleeve to the absence of the PE sleeve. The computer 1 determines the presence or absence of the water leak and the like under the condition including the predetermined threshold for the corrected signal value.

The computer 1 confirms whether the sensor 3 that has detected a target signal is the sensor 3 installed for the pipeline without the PE sleeve, or the sensor 3 installed for the pipeline with the PE sleeve based on the pipeline information d2. When confirming that the sensor 3 that has detected the target signal corresponds to the pipeline without the PE sleeve, the computer 1 performs the correction operation on the signal value to have an equivalent detection sensitivity of the sensor 3 in the pipeline without the PE sleeve. Specifically, this correction operation is multiplication of a predetermined correction coefficient or the like. For example, a value V1$a$ in the straight line 2101 becomes a value V1$b$ in the straight line 2102 through the correction operation. When the correction coefficient (for example, a value smaller than 1) is set to Cx, V1$b$=Cx×V1$a$.

The computer 1 determines the presence or absence of the water leak and the water leak amount using the condition including the predetermined threshold for a vibration intensity value of the corrected detection signal. In this example, this predetermined threshold has thresholds HC1, HC2, and HC3 as three thresholds when determining the water leak amount level (HC1<HC2<HC3). If the corrected value (for example, the value V1$b$) is within a range 2104 equal to or larger than the threshold HC1 and smaller than the threshold HC2, it is determined that the water leak amount level is small. If the corrected value (for example, a value V2$b$) is within a range 2105 equal to or larger than the threshold HC2 and smaller than the threshold HC3, it is determined that the water leak amount level is middle. If the corrected value (for example, a value V3$b$) is within a range 2106 equal to or larger than the threshold HC3, it is determined that the water leak amount level is large. In this manner, it is possible to enhance the water leak sensing accuracy in accordance with the environment depending on the presence or absence of the PE sleeve according to the second determination scheme.

Figure 22:
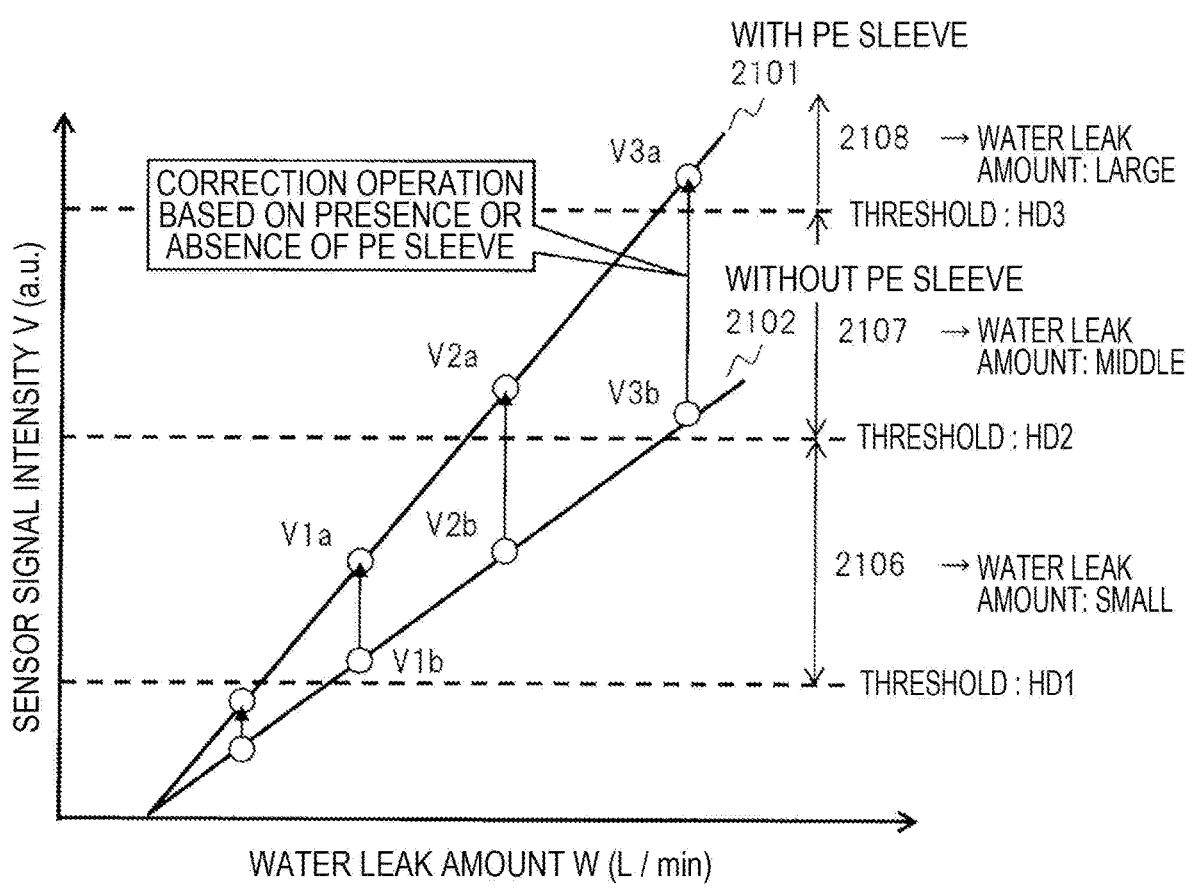
FIG. 22 is a graph illustrating a second example of a second determination scheme according to the water leak presence/absence determination in the water leak sensing system of the second embodiment.

FIG. 22 illustrates a similar graph for another example of the second determination scheme. Contrary to FIG. 21, in this example of the second determination scheme, a correction operation to correct the sensitivity from the absence of the PE sleeve to the presence of the PE sleeve is applied for a signal value of the sensor 3 corresponding to the absence of the PE sleeve on the basis of the environment with the PE sleeve. The straight line 2101 indicates a detection signal value according to the water leak amount regarding the sensor 3 associated with the pipeline with the PE sleeve or a signal value obtained after correction from the absence of the PE sleeve to the presence of the PE sleeve. In the example of the second determination scheme, a condition including a predetermined threshold (for example, a threshold HD1, HD2, or HD3) on the basis of the pipeline and the environment with the PE sleeve is set in the computer 1. When a signal of the target sensor 3 corresponds to the pipeline without the PE sleeve (the straight line 2101) based on the management information d2, the computer 1 performs the correction operation and determines the presence or absence of the water leak and the like under the condition including the predetermined threshold for the corrected signal value. If the corrected value (for example, the value V1$a$) is within a range 2106 equal to or larger than the threshold HD1 and smaller than the threshold HD2, it is determined that the water leak amount level is small. If the corrected value (for example, a value V2$a$) is within a range 2107 equal to or larger than the threshold HD2 and smaller than the threshold HD3, it is determined that the water leak amount level is middle. If the corrected value (for example, a value V1$a$) is within a range 2108 equal to or larger than the threshold HD3, it is determined that the water leak amount level is large.

[Water Leak Position Determination, Cross-Correlation Scheme]

A water leak position determination scheme using a cross-correlation scheme according to the first embodiment and the second embodiment will be described as follows. FIGS. 23A, 23B, and 23C illustrate explanatory views of the water leak position determination scheme of the cross-correlation scheme. The water leak position determination using the cross-correlation scheme is performed after the water leak presence/absence determination and before the water leak amount determination as described above (Step S17 in FIG. 3).

FIG. 23A illustrates a model of a pipeline and the sensor 3 according to the cross-correlation scheme. In a partial pipeline of a certain water pipe 4, for example, a pair of a sensor Sa and a sensor Sb is provided as a pair of the sensors 3 relating to the cross-correlation scheme. A determination target is the position px of the water leak point PX on the pipeline between the sensors 3. The computer 1 determines a water leak position in the water pipe 4 between the sensors 3 based on the cross-correlation scheme using detection signal data in such a pair of the sensors 3 (Sa and Sb). The detection signal data of the sensor Sa is Da(ta), and the detection signal data of the sensor Sb is Db(tb). Here, to and tb represent each detection time. Vibration intensity values of the respective detection signal data are denoted by Va and Vb. Incidentally, the vibration intensity value corresponds to, for example, a power value of a frequency spectrum.

A vibration of a water leak generated at the water leak point PX is transmitted in the pipeline. In this example, the respective left and right water leak vibrations 71 and 72 in the X direction from the water leak point PX arrive at the sensors 3 (Sa and Sb), located at positions Pa and Pb with distances Xa and Xb, at arrival times T1 and T2, respectively. For example, the water leak vibration 71 from the water leak point PX toward the left reaches the sensor Sa at the arrival time T1. In the sensor Sa and the sensor Sb, a water leak signal is detected at a timing shifted by an arrival time difference depending on the distances Xa and Xb. The arrival time difference is denoted by TD, and TD=(T1−T2). The distance between the sensors 3 (Sa and Sb) is indicated by a distance Lab.

A cross-correlation function relating to the cross-correlation scheme is denoted by $\Phi(\pi)$. A peak value of the cross-correlation function $\Phi(\pi)$ can be calculated based on the detection signal data Da(ta) of the sensor Sa and the detection signal data Db(tb) of the sensor Sb. The arrival time difference TD can be calculated based on the peak value of the cross-correlation function $\Phi(\pi)$. In addition, the arrival time difference TD can be calculated from a relational expression between the distances Xa and Xb and propagation speed of a water leak vibration sound. The propagation speed of the water leak vibration sound is one of the above-described setting information. The distances Xa and Xb of the respective sensors 3 (Sa and Sb) can be calculated based on the arrival time difference TD and the relational expression. That is, the position px of the water leak point PX can be specified, as an estimated value, based on the distances Xa and Xb. Incidentally, positions, such as the position px, can be expressed as position information of a predetermined format in the pipeline information d2 of the water supply network 40 or the like.

When two or more sensors detect signals from the same water leak point (water leak signals representing vibration intensities), a cross-correlation represents the similarity between those signals. As illustrated in FIG. 23A, the sensor Sa is located at the position Pa with the distance Xa from the water leak point PX, and the sensor Sb is located at the position Pb with the distance Xb from the water leak point PX. For example, when the sensor Sa detects a water leak signal and the sensor Sb does not detect a water leak signal, the signals of these two sensors Sa and Sb have no similarity, in other words, have no cross-correlation. On the other hand, when not only the sensor Sa but also the sensor Sb detects the water leak signal, the two signals have similarity, in other words, have the cross-correlation. When the two signals are shifted in time by the difference in distance from the water leak point PX, the same signal can be obtained. That is, when the two signals of the two sensors have the cross-correlation, the distances Xa and Xb from the sensors Sa and Sb to the water leak point PX can be found based on the time difference between the two signals (the arrival time difference TD), that is, the position px of the water leak point PX can be specified.

Incidentally, the difference between the water leak signals (the vibration intensities thereof) detected by the respective sensors 3 is mainly caused by a difference in speed (that is, sound speed) of a vibration or a sound propagating in the pipe and water. Therefore, the signal of the sensor 3 strictly depends on details of a type, a diameter, a shape, a joint, a material, and the like of the pipe. The sound speed in water is about 1.2 to 1.4 km/sec although changing even depending on the environment of the pipe. For example, when there is a difference of 10 milliseconds as a time difference between the detection times (ta and tb) in two signals of the two sensors Sa and Sb, a difference between the distances (Xa and Xb) of the respective sensors Sa and Sb from the water leak point PX becomes 12 to 14 m. When the sensors Sa and Sb are located to be equidistant from the water leak point PX, the time difference between signals is zero (midpoint).

When only the sensor Sa detects a water leak signal, it is difficult to specify whether a position of the water leak point PX is a position at a distance (+Xa) on the right or a position at the distance (−Xa) on the left with respect to the position Pa of the sensor Sa. However, when the sensor Sb also detects a water leak signal, the position of the water leak point PX can be specified by the cross-correlation between the two sensors 3 as described above. Therefore, when the above-described cross-correlation scheme is used for the water leak sensing as in the water leak sensing system 10 according to the first and second embodiments, not only the presence or absence of the water leak but also the water leak position can be specified or estimated. For example, if the operator performs a confirmation inspection by listening to a sound when the presence of the water leak has been sensed, a measurement range in the inspection can be greatly narrowed by using the information on the water leak position. As a result, an effect of reducing cost required for the work is obtained. In addition, the detection signals of two or more sensors 3 indicate the water leak from the same point (water leak point PX) in the cross-correlation scheme described above, and thus, it is possible to dramatically improve the accuracy rate of the water leak determination as compared to the case of not using the cross-correlation scheme.

FIG. 23B illustrates an example of a water leak position determination of a pipeline network as a supplement. For example, the water pipe W1 has water pipes wp1, wp2, wp3, wp4, wp5, and the like as partial pipelines, and has water control valves b1, b2, b3, b4, b5, b6, and the like as the water control valves 5. It is assumed that a PE sleeve is installed in the water pipe W1. For example, sensors SS1, SS2, and SS3 are arranged as the sensors 3 (SB) in the water control valves b1, b3, and b5 according to the sensor arrangement example of the first embodiment. As examples of the water leak point PX, water leak points Px1 and Px2 are illustrated. A pair of the sensors SS1 and SS2 and a pair of the sensors SS2 and SS3 are provided as pairs of the sensors 3 relating to the cross-correlation scheme.

First, it is possible to specify a partial pipeline determined to have a water leak in the pipeline network, in the above-described water leak presence/absence determination scheme. There is a case where it is difficult to specify one pipeline depending on a configuration of the pipeline network. For example, when it has been determined that the water leak is present by the water leak presence/absence determination of the computer 1 by referring only to a signal of the sensor SS2, it is difficult to specify whether a water leak point is present in a pipeline on the right side or a pipeline on the left side with respect to the sensor SS2. Next, when the respective signals of the sensors SS1, SS2, and SS3 are referred to and it is determined that the water leak is present, for example, regarding the signals of both the sensor SS1 and the sensor SS2 by the water leak presence/absence determination of the computer 1, it is possible to determine that the water leak point and the water leak position are included in a pipeline (the water pipes wp1 and wp2) between the sensor SS1 and the sensor SS2.

Next, the water leak position determination of the cross-correlation scheme is applied by the computer 1 so that it is possible to specify the water leak position on the pipeline determined to have the water leak. For example, the computer 1 performs the water leak position determination in the cross-correlation scheme in the same manner as in FIG. 23A with respect to the pair of the sensor SS1 and the sensor SS2 and the corresponding pipeline (water pipes wp1 and wp2). As a result, the water leak position can be specified as, for example, the water leak point Px1 on the water pipe wp1.

FIG. 23C illustrates, as a supplement, a configuration example of a pair list which is one of management information relating to the cross-correlation scheme. A table of FIG. 23C illustrates an example of the pair list corresponding to the example of FIG. 23B. The pair list is information configured to manage a pair of two sensors 3 arranged to be adjacent to each other via a pipeline in a pipeline shape of the water supply network 40. The computer 1 holds such information of the pair list in the memory 102 as a part of, for example, the pipeline information d2. During the water leak position determination (Step S17 in FIG. 3), the computer 1 performs the determination with reference to such information of the pair list. The table of the pair list of FIG. 23C has a pair ID, a first sensor ID, a second sensor ID, a pipeline ID, a distance, and the like as columns. The pair ID is identification information of a pair of two sensors 3. The first sensor ID is an ID of one first sensor constituting the pair, and the second sensor ID is an ID of the other second sensor constituting the pair. The pipeline ID is an ID of a pipeline arranged between the sensors 3 of the pair. The distance is a distance between the sensors 3 of the pair. For example, in the case of the pair ID=1 in the first row, the first sensor is the sensor SS1, the second sensor is the sensor SS2, the pipeline between the sensors 3 is the water pipes wp1 and wp2, and the distance between the sensors 3 is a distance L01.

[Effect (2)]

As described above, the improvement of the water leak sensing accuracy and the like can be realized according to the water leak sensing system 10 of the second embodiment. As a water leak sensing system according to another embodiment, a mode having both the first function of the first embodiment and the second function of the second embodiment can be adopted. Although the invention has been given in detail based on the embodiments as above, the invention is not limited to the above-described embodiments, and can be modified in various ways within a scope not departing from a gist thereof.

What is claimed is:

1. A water leak sensing system comprising:
a plurality of sensor terminals that include sensors each installed in a pipeline in a pipeline network and detecting a vibration of the pipeline as a signal, the pipeline buried in ground and allowing a fluid of water or another substance to flow; and
a computer that communicates with the plurality of sensor terminals, senses a leak of the fluid from the pipeline based on detection signal data of a plurality of the sensors of the plurality of sensor terminals, and outputs a result, wherein
the pipeline of the pipeline network is either a first pipeline not covered by a pipe covering member or a second pipeline covered by the pipe covering member, wherein a first vibration intensity of a first sound of a first leak in the first pipeline is greater than a second vibration intensity of a second sound of a second leak in the second pipeline,
based on the first and second vibration intensities of the first and second sounds of the first and second leaks in the first and second pipelines, respectively, the first leak in the first pipeline is detectable by the sensors at a first distance from a first leak point, and the second leak in the second pipeline is detectable by the sensors at a second distance, longer than the first distance, from a second leak point, and
the plurality of sensors in the pipeline network are arranged at an interval based on the first distance in a first area including the first pipeline in the pipeline network, and are arranged at an interval based on the second distance in a second area of the pipeline network including the second pipeline based on pipeline information including information on presence or absence of the pipe covering member in the pipeline network, a density of the sensors in the first area including the first pipeline being greater than a density of the sensors in the second area including the second pipeline.

2. The water leak sensing system according to claim 1, wherein
the computer calculates arrangement positions of the plurality of sensors in the pipeline network with reference to the pipeline information based on an operation of an operator, and outputs sensor arrangement information as a calculation result.

3. The water leak sensing system according to claim 1, wherein
the computer displays the sensor arrangement information on a screen, and
the screen includes display of the first pipeline, the second pipeline, and arrangement positions of the plurality of sensors in the pipeline network.

4. A water leak sensing system comprising:
a plurality of sensor terminals that include sensors each installed in a pipeline in a pipeline network and detecting a vibration of the pipeline as a signal, the pipeline buried in ground and allowing a fluid of water or another substance to flow; and
a computer that communicates with the plurality of sensor terminals, senses a leak of the fluid from the pipeline based on detection signal data of a plurality of the sensors of the plurality of sensor terminals, and outputs a result, wherein
the pipeline of the pipeline network is either a first pipeline not covered by a pipe covering member or a second pipeline covered by the pipe covering member, wherein a first vibration intensity of a first sound of a first leak in the first pipeline is greater than a second vibration intensity of a second sound of a second leak in the second pipeline, and
based on the first and second vibration intensities of the first and second sounds of the first and second leaks in the first and second pipelines, respectively, the first leak in the first pipeline is detectable by the sensors at a first distance from a first leak point, and the second leak in the second pipeline is detectable by the sensors at a second distance, longer than the first distance, from a second leak point,
the computer determines at least one of presence or absence of the first leak or the second leak and a leak amount of the fluid from the first or second pipeline based on signals from the plurality of sensors, and makes a determination by applying different conditions depending on whether there is the first leak from the first pipeline or the second leak from the second pipeline.

5. The water leak sensing system according to claim 4, wherein
during the determination, the computer applies a condition including a first threshold to a value of the signals from a sensor when the sensor is installed with respect to the first pipeline based on the pipeline information, and applies a condition including a second threshold to a value of the signals when the sensor is installed with respect to the second pipeline.

6. The water leak sensing system according to claim 4, wherein
during the determination, the computer applies a condition including a predetermined threshold to a value of the signals from a sensor when the sensor is installed with respect to the first pipeline based on the pipeline information, and performs a predetermined correction operation on the value of the signal and applies the condition including the threshold to the corrected value of the signal when the sensor is installed with respect to the second pipeline.

7. The water leak sensing system according to claim 4, wherein
during the determination, the computer applies a condition including a predetermined threshold to a value of the signals from a sensor when the sensor is installed with respect to the second pipeline based on the pipeline information, and performs a predetermined correction operation on the value of the signal and applies the condition including the threshold to the corrected value of the signal when the sensor is installed with respect to the first pipeline.

8. The water leak sensing system according to claim 1, wherein
the computer determines a position of the first leak or the second leak based on a cross-correlation scheme for the signals in a pair of two sensors arranged via the first and second pipelines in the pipeline network.

9. The water leak sensing system according to claim 1, wherein
the pipeline network is a water supply network, and
the sensor terminals are installed at a water control valve of the water supply network.

10. The water leak sensing system according to claim 4, wherein
the computer determines a position of the first leak or second leak on the first pipeline or second pipeline based on a cross-correlation scheme for signals in a pair of two sensors arranged via the first pipeline or second pipeline in the pipeline network.

11. The water leak sensing system according to claim 4, wherein
the pipeline network is a water supply network, and
the sensor terminals are installed at a water control valve of the water supply network.

12. A water leak sensing method in a water leak sensing system, which includes: a plurality of sensor terminals that include a sensor installed in a pipeline in a pipeline network and detecting a vibration of the pipeline as a signal, the pipeline buried in ground and allowing a fluid of water or another substance to flow; and a computer that communicates with the plurality of sensor terminals, senses a leak of the fluid from the pipeline based on detection signal data of a plurality of sensors of the plurality of sensor terminals, and outputs a result, the pipeline of the pipeline network being either a first pipeline not covered by a pipe covering member or a second pipeline covered by the pipe covering member, wherein a first vibration intensity of a first sound of a first leak in the first pipeline is greater than a second vibration intensity of a second sound of a second leak in the second pipeline, based on the first and second vibration intensities of the first and second sounds of the first and second leaks in the first and second pipelines, respectively, the first leak in the first pipeline is detectable by the sensors at a first distance from a first leak point, and the second leak in the second pipeline is detectable by the sensors at a second distance, longer than the first distance, from a second leak point, the method comprising arranging the plurality of sensors in the pipeline network at an interval based on the first distance in a first area including the first pipeline in the pipeline network, and at an interval based on the second distance in a second area of the pipeline network including the second pipeline based on pipeline information including information on presence or absence of the pipe covering member in the pipeline network, and arranging a density of the sensors in the first area including the first pipeline to be greater than a density of the sensors in the second area including the second pipeline.

* * * * *